(12) United States Patent
Inoue et al.

(10) Patent No.: US 6,347,280 B1
(45) Date of Patent: Feb. 12, 2002

(54) NAVIGATION SYSTEM AND A MEMORY MEDIUM IN WHICH PROGRAMS ARE STORED

(75) Inventors: Koji Inoue; Tomoaki Sakai, both of Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/644,099

(22) Filed: Aug. 23, 2000

(30) Foreign Application Priority Data

Aug. 23, 1999 (JP) .......................................... 11-235022
Aug. 23, 1999 (JP) .......................................... 11-235023
Aug. 23, 1999 (JP) .......................................... 11-235024

(51) Int. Cl.$^7$ ..................... G01C 21/00; G01C 22/00; G01S 5/00; G01S 11/00; G06F 7/00; G06F 17/00; G06F 19/00; G06F 165/00

(52) U.S. Cl. .................. 701/211; 701/200-210; 701/212-215; 340/990; 340/995; 340/988; 340/910; 364/436; 364/438; 364/565; 364/449; 364/443; 342/451; 342/452; 345/123; 345/125; 345/121; 345/122

(58) Field of Search .................................. 701/200-215; 340/990, 995, 988, 910; 364/436, 438, 565, 449, 443; 342/451, 452; 345/123, 125, 121, 122

(56) References Cited

U.S. PATENT DOCUMENTS

| | | | | |
|---|---|---|---|---|
| 5,648,904 A | * | 7/1997 | Scott | 364/436 |
| 5,908,465 A | * | 6/1999 | Ito et al. | 701/211 |
| 5,928,308 A | * | 7/1999 | Nanba et al. | 701/211 |
| 5,938,718 A | * | 8/1999 | Morimoto et al. | 701/201 |

* cited by examiner

Primary Examiner—Willam A. Cuchlinski, Jr.
Assistant Examiner—Ronnie Mancho
(74) Attorney, Agent, or Firm—Oliff & Berridge PLC

(57) ABSTRACT

A navigation system that provides guidance information if more than three guide intersections are successively located adjacent each other. The vehicle navigation system's guidance information output is controlled on the basis of the successive relationships between respective intersections and is stored as programs in a memory medium.

14 Claims, 19 Drawing Sheets

|  | INTERSECTION FIGURE (DISPLAY) | VOICE GUIDANCE |
|---|---|---|
| INDIVIDUAL GUIDANCE | ONE GUIDE INTERSECTION | ONE GUIDE INTERSECTION |
| INDIVIDUAL DISPLAY SUCCESSIVE VOICE GUIDANCE | ONE GUIDE INTERSECTION | TWO GUIDE INTERSECTIONS |
| PLURAL DISPLAY SUCCESSIVE VOICE GUIDANCE | TWO GUIDE INTERSECTIONS | TWO GUIDE INTERSECTIONS |

Fig. 9

NAVIGATION SYSTEM AND A MEMORY MEDIUM IN WHICH PROGRAMS ARE STORED

BACKGROUND OF THE INVENTION

1. Field of Invention

This invention relates to a navigation system that outputs guidance information along a route. Further, the intersection according to the invention also includes a junction point.

2. Description of Related Art

A guidance method according to a previous navigation system is explained with reference to FIG. 4 wherein a predetermined guidance route is shown and includes sections A, B, C and D. According to the guidance route in FIG. 4, a vehicle approaching guide intersection 1 makes a right turn at guide intersection 1, a left turn at guide intersection 2 and a right turn at guide intersection 3. A figure of the guide intersection 1 and an arrow indicating "Turn right" are displayed on a display screen and the content thereof is audible with voice output as the vehicle approaches guide intersection 1. After passing through the guide intersection 1, the figure is redrawn to a figure of the guide intersection 2, which is then displayed on the screen with an arrow indicating "Turn left" and the content thereof is audible with voice output. Each time the vehicle approaches a subsequent guide intersection, a figure of the previous guide intersection is redrawn and guidance is performed with display and voice output in the same manner explained above. This method is hereinafter called individual guidance that performs display/voice guidance on one guide intersection.

When approaching a guide intersection 1, for example, if a distance d1 between the guide intersection 1 and the next guide intersection 2 is relatively short (ex. 750 m), then a figure of guide intersection 1 is displayed on the screen with an arrow indicating "Turn right" and voice output guidance is provided as in "Make a right turn, then make a left turn N miles ahead" thus providing guidance output for each of the immediately following two intersections. After passing through guide intersection 1, the figure is rewritten to display a figure of the guide intersection 2, which is provided with an arrow indicating "Turn left". The content of the display for guide intersection 2 is also audible with voice output to execute further route guidance. This method is hereinafter called individual display/successive voice guidance which displays one guide intersection and executes voice guidance on a plurality of guide intersections.

Further, when the distance d1 between guide intersections 1 and 2 is relatively short (ex. 150 m), a figure composed of both guide intersections 1 and 2 is displayed with arrows indicating "Turn right" and "Turn left" together with voice output guidance of "Make a right turn, then make a left turn N miles ahead". This method is hereinafter called plural displays/successive voice guidance that performs a plurality of displays and voice guidance on a plurality of guide intersections.

Another guidance method according to a previous navigation system is explained with reference to FIG. 11, wherein exits or branch roads diverging from an expressway are all treated as intersections requiring guidance when the vehicle travels through the long section of an expressway or a motorway wherein roads are under the same road name. For example, in FIG. 11, a guidance route involving Roads 11, 12 and 13 is determined as approaching a guide intersection R1. A figure of the guide intersection R1 and an arrow indicating "Right direction" are displayed on a screen and the content thereof is audible with voice output directing one to Road 13. After passing through guide intersection R1 and as approaching guide intersection R2, the figure of the guide intersection R1 is rewritten to a figure of the guide intersection R2, and the arrow indicating "the direction" is displayed again with the content thereof audible with voice output directing one further. Thus, guidance is performed by redrawing a previous figure of an intersection and performing display/voice guidance each time one approaches a new guide intersection in the same way as above.

Another previous navigation system is shown in FIG. 14, wherein rotary intersections are beltways to which a plurality of entering and departing roads are connected. Such rotary intersections are all treated as requiring guidance in the previous navigation system. FIG. 14 shows rotary intersections R10 to Rn in succession between a road 21 and a road n+1. A guidance route is provided straight on between the road 21 and the road n+1, wherein a voice phrase of "It is a rotary, take a straight direction. Then, take the second exit." is output in a section A1. Thereafter, in the same way, route guidance is performed at each rotary intersection by repeating and outputting the voice guidance of "It is a rotary, take a straight direction. Then, take the second exit." in the respective sections A2, An, An+1 and so on.

The previous related art therefore provides that when two guide intersections are in succession, route guidance is easy for a driver to understand by applying the above-stated three methods respectively in the appropriate case. Further, as shown in FIG. 4, when more than 3 guide intersection and the distance d1 between the guide intersection 1 and the guide intersection 2, and the distance d2 between the guide intersection 2 and the intersection 3 are both short, a method of the above plural display/successive voice guidance is applied. In such a case, when approaching the guide intersection 1, a figure composed of the intersections 1, 2 and 3 is displayed with arrows indicating "Turn right", "Turn left" and "Turn right" and a voice guidance of "Make a right turn, then make a left turn N miles ahead. A branch point comes further ahead (or a branch point follows)" is provided. The voice guidance specific to the guide intersection 3 in the form of "A branch point comes ahead (or a branch point follows)" is provided to avoid confusion by the driver who might become confused were the voice guidance output as merely "Turn right, then left N miles ahead, then, make a right turn (or then, make a right turn, and make a left turn further ahead.)".

The related art further provides that when more than three guidance intersections adjacent to each other are in succession, display/voice guidance processing is performed on all the guide intersections at once. Therefore, the third guide intersection, and any following intersections, are displayed in a figure. Voice guidance is still provided in the form of, for example, "A branch point comes ahead (or a branch point follows.)". Thus, it is difficult for a driver to recognize all the visual and audible route guidance provided. This raises a problem that route guidance is unclear.

The invention is made to solve the above problem by providing a navigation system in which the driver can easily recognize route guidance information when more than three guide intersections are in succession, and in which a memory medium stores the programs providing the route guidance information.

Further, whereas previous navigation systems perform route guidance each time a vehicle approaches a guide intersection even if the vehicle maintains travel on the same named road, which, in most cases, does not require route guidance as the route is evident to the driver, the invention eliminates confusion by eliminating route guidance at successive intersections along the same named road. The related art also poses the problem of driver confusion by presenting a large amount of information as guidance output when a plurality of guide intersections are in succession, as when a large number of rotary intersections are in succession in one display section, and route guidance is output with several similar voice phrases while driving, thus confusing the driver. The invention is made to solve the above problems by providing a navigation system in which the driver can drive comfortably without confusion by eliminating needless route guidance when guide intersections are in succession on roads under the same road name, along with a memory medium in which the programs are stored.

Further, when guide intersections are in succession and either of the above three related art methods are applied as respectively appropriate, a problem with route guidance involving expressway entrance and exit, driveways and the like, still occurs. This problem is explained with reference to FIG. 15, wherein route guidance is described with the condition that two normal roads relatively adjacent to each other intersect an expressway. The guidance route in this instance includes a general road Aa, the guide intersection 10 to the expressway entrance Bb, the expressway Cc, the guide intersection 20 to the expressway exit Dd, a normal road Ee, wherein the distance between the expressway entrance Bb and exit Dd, is less than a predetermined distance (e.g., 2 km). The Expressway Cc distance less than the predetermined distance is equivalent to the condition that the distance d1 between the guide intersections 1 and 2 is relatively short (e.g., less than 750 m) described in FIG. 4. According to the previous individual display/successive voice guidance methods, a figure of the guide intersection 10 is displayed showing general road Aa of FIG. 15, and voice guidance of "Make a right turn at the expressway entrance. The expressway exit is ahead." is performed on the guide intersections 10 and 20. Once traveling in the Expressway Cc, the previous figure is rewritten to display instead a figure of the guide intersection 20, along with voice guidance of "Take the right direction at the exit expressway. Then, make a right turn ahead.". This latter guidance is performed for directing travel in and through intersections 20 and 30. In the exit Dd, the previous figure is rewritten to a figure of the guide intersection 30, which is displayed along with voice guidance of "Make a right turn."

However, in the above prior method, when the entrance Bb and the exit Dd are located adjacent to each other, route guidance on the exit Dd is output as one approaches the entrance Bb. Route guidance for the exit Dd is performed therefore despite a present vehicle position that is still on a normal road Aa that does not even come into the expressway directly. Moreover, route guidance is performed for Road E despite it never directly entering the expressway Cc either. Thus, a problem occurs that guidance is not clear for the driver to understand. This problem is similarly raised when a junction of one expressway and another expressway occurs in addition to the relationship between a normal road and an expressway.

The invention solves the above problems by providing a navigation system capable of performing more accurate route guidance information to a driver by separately providing route guidance for guidance intersections having different attributes. Thus, route guidance is well-organized and easily understood by a driver even as one passes through successive intersections. A memory medium in which the route guidance programs are stored is provided as well.

SUMMARY OF THE INVENTION

In order to solve the above problems, the navigation system provides for outputting route guidance information along a route and controls the route guidance information output on the basis of the successive relationship of intersections when more than three intersections requiring guidance are in succession.

The invention provides a navigation system for outputting route guidance information along a route and further comprises a means for obtaining the distance between each of the guide intersections requiring guidance on the route and a control means for judging a successive relationship of each intersection on the basis of the distance between the guide intersections obtained by the obtaining means, wherein the control means controls the content of route information on the basis of the judged successive relationship when more than three guide intersections are in succession.

The invention provides a navigation system wherein the control means draws a figure composed of guide intersections making the shortest distance when a plurality of guide intersections are in succession.

The invention provides a memory medium in which programs of a navigation system for outputting route guidance information along a route are stored, wherein the memory medium stores a program for controlling route guidance information to be output on the basis of each successive relationship of intersections when more than three intersections requiring guidance are in succession.

Further, the navigation system provides a navigation system for outputting route guidance information along a route wherein guidance on guide intersections is not performed when guide intersections are in succession and a vehicle travels on the same-named road.

The invention provides a navigation system for outputting route guidance information along a route further comprising a means for obtaining guide intersections requiring route guidance on the route and road names between the guide intersections and a control means for controlling route guidance on the guide intersections on the basis of the guide intersections and road names obtained by the obtaining means, wherein the control means control that guidance on the guide intersections is not performed when a plurality of guide intersections is in succession and the guide intersections are under the same road name.

The invention provides a navigation system that operates properly when the guide intersections are rotary intersections.

The invention provides a navigation system wherein information on distance and road names to the last intersection are output for the first guide intersection among the successive guide intersections according to claims 5 and 6.

The invention is a memory medium in which programs of a navigation system for outputting route guidance information along a route are stored, wherein the memory medium stores a program for controlling that route guidance on guide intersections is not performed when a vehicle travels on a same-named road and the guide intersections are in succession.

Further, the navigation system provides for outputting route guidance information along a route wherein the guide information to be output is controlled on the basis of road attributes to respective guide intersections when guide intersections requiring guidance are in succession.

The invention provides a navigation system for outputting route guidance information along a route further comprising a means for obtaining guide intersections requiring guidance on the route and road attributes to the guide intersections and a control means for outputting route guidance information on guidance intersections on the basis of the successive relationship of the guide intersections and road attributes to the guide intersections obtained by the obtaining means, wherein the control means controls route guidance information on the basis of each road attribute to the guide intersection when the guide intersections requiring guidance are in succession.

The invention provides a navigation system for outputting route guidance information along a route further comprising a means for obtaining guide intersections requiring guidance on the route and a judgment means for judging whether the guide intersections obtained by the obtaining means are respectively an entrance or an exit and a distance between the entrance and the exit, wherein the control means controls that individual route guidance is performed respectively for the entrance and the exit when the distance between the entrance and the exit is within a predetermined distance.

The invention provides a memory medium in which programs of a navigation system for outputting guide information along a route are stored, wherein the memory medium stores a program for controlling route guidance information to be output on the basis of each road attribute to the guide intersection when the guide intersections requiring guidance are in succession.

According to the invention, a driver can easily identify route guidance information since successive relationships of guide intersections are judged to control route guidance output on the basis of the judged result.

Further, a driver can have a pleasant driving experience without confusion caused by excessive route guidance information by eliminating successive route guidance information for successive guide intersections on the same-name road.

Further, more accurate route guidance information is provided to a driver by organizing route guidance according to guide intersections having different attributes at an appropriate time when the vehicle is traveling the various intersections. For example, when the vehicle enters an expressway, route guidance information thereon is output, as in, "Take the right direction at the expressway entrance, which is 300 m ahead". Similarly, when the vehicle is departing from the expressway, guidance information thereon is output, as "Take the right direction 700 m ahead, which is the expressway exit", for example. Thus, it is controlled that route guidance information is made by distinguishing between approaching and departing, for example, even if the entrance and exit are located adjacent to each other. Further route guidance information on each point can be identified correctly since route guidance is output by controlling that guidance on the entrance is performed at the entrance.

BRIEF DESCRIPTION OF THE DRAWINGS

FIG. 9 is a list describing methods of guidance according to FIG. 8;

DETAILED DESCRIPTION OF PREFERRED EMBODIMENTS

Figure 1:
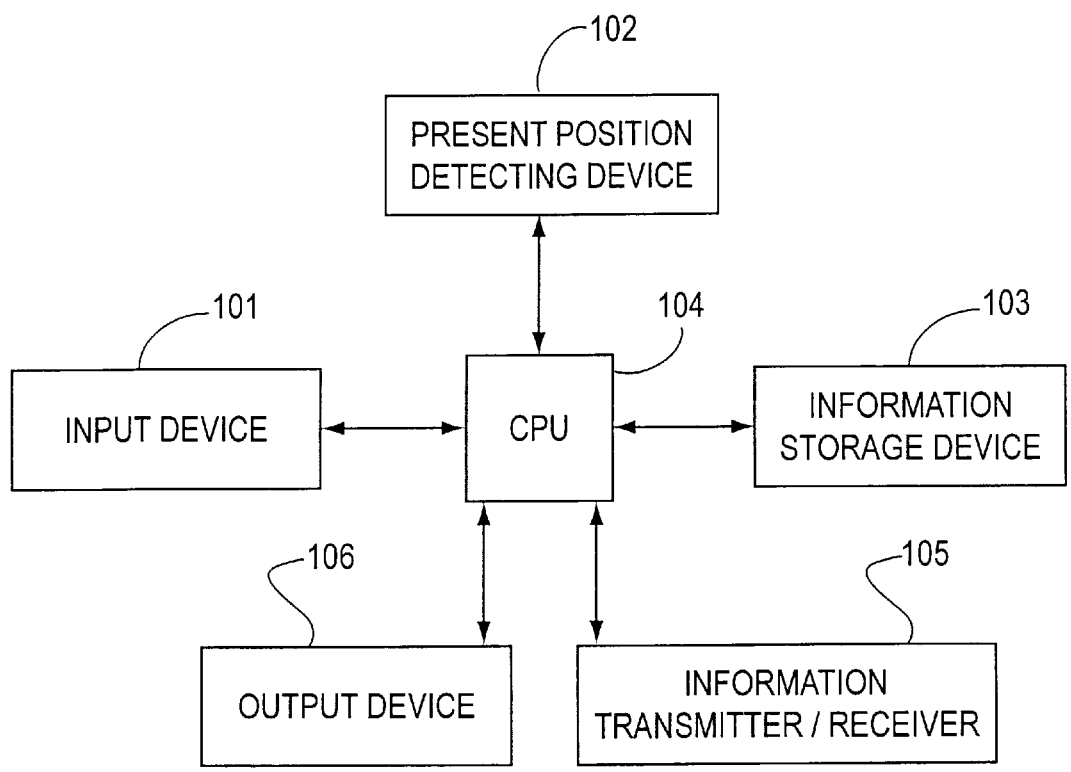
FIG. 1 is a block diagram showing an example of the structure of a navigation system according to the invention.

Embodiments of the invention will be described below with reference to the drawings. FIG. 1 is a diagram showing an example structure of a navigation system according to the invention, which comprises an input device 101 for inputting information relating to route guidance, a present position detecting device 102 for detecting information relating to the present position of a vehicle, an information memory, or storage, device 103 in which navigation data necessary for route calculation and visual/voice guidance data necessary for route guidance and programs (application and/or OS), etc. are stored, a central processing unit 104 for controlling the entire system in conjunction with executing route search processing and display/voice guidance processing necessary for route guidance, an information transmitter/receiver 105 for receiving road information and/or traffic information relating to a vehicle which is traveling and transmitting information relating to the present position of the vehicle and an output device 106 for outputting information relating to route guidance.

The input device 101 is equipped with functions for inputting a destination and instructing the central processing unit 104 to execute navigation processing in accord with a driver's intention. A touch switch, a jog dial or the like is provided for inputting a destination in the form of a telephone number or a coordinate on a map, etc., and for requesting route guidance. Of course, an input device, such as a remote control, may be applied. Further, it is possible to add a voice recognition device for enabling voice input or a record card reader for reading data recorded on an IC card or a magnetic card. Furthermore, there may be added a data communication unit for exchanging data between information sources, such as information center accumulating data, necessary for navigation and for providing information through communication lines upon a driver's request. A portable style electric device having map data and destination data may be provided as well.

The present position detecting unit 102 comprises a Global Positioning System (GPS) receiver for calculating a present position, a traveling speed or an absolute direction of a vehicle, a beacon receiver for receiving information relating to a present position, a lane, etc., a data receiving unit for receiving a corrected signal of the GPS by utilizing a cellular phone (car phone), an FM multiplex signal, etc., for example, a relative directional sensor for detecting travel directions of the vehicle in a relative direction by utilizing a steering sensor, a gyro sensor, or a velocity sensor for detecting travel distance from the number of revolutions of a wheel, and the like.

The information memory device 103 is an external storage device in which programs and data for navigation are stored, for example comprising a CD-ROM, a DVD-ROM, a floppy disc, a memory card, etc. The external storage unit stores a program for executing processing, such as a route search, a program for executing guidance in an interactive manner by an voice input, a program for executing a display/voice output control necessary for route guidance, a program for searching a point or a facility, etc. The external storage unit further comprises files of map data, search data, map matching data, destination data, registered point data, road data, image data for branch points, such as intersections, etc., genre data, landmark data, etc., such that all data necessary for the navigation system are stored. Here, the invention can be applied to a type of navigation in which the data are exclusively stored in a CD-ROM whereas the programs are stored in the CPU. Here, the invention can be applied to a type of navigation in which the data are exclusively stored in the CD-ROM whereas the programs are stored in the CPU.

The central processing unit 104 comprises a CPU for performing various calculation processing, a flash memory, such as ROM, to store important information, such as a program, to execute route search and route guidance, or data to set a condition or identify various parameters, etc. in a nonvolatile manner. The ROM may be, for example, an EEPROM for Electrically Erasable and Programmable ROM. A ROM having such a nonvolatile memory means stores a program for executing data check of the flash memory and CD-ROM, and a program for executing update processing. A RAM is also provided for temporarily storing searched route guidance information, such as a point coordinate of the set destination, a road name code number, etc. or data under the calculation processing. The central processing unit further comprises a voice processor in which an analog signal is converted by combining voices, phrases, single sentences and sounds, etc. read out of the information memory device 103 on the basis of the voice output control signal from the CPU or on the basis of the execution of route guidance in an interactive manner by the voice input from the input unit 101. Further provided are a communication interface for executing an exchange of input/output data by communications, a sensor-input interface for accepting a sensor signal received from the present position detecting device 102, and a clock for completing date and time into internal diagnosis information.

The program for executing the update processing mentioned above may be stored in an external memory unit.

Programs relating to the invention and programs for executing the other navigation may be all stored in a CD-ROM which is an external memory medium, or all or a part of them may be stored in a ROM on the unit side. The data and programs stored in this external memory medium are inputted to the CPU of the navigation system as external signals and a calculation processing is executed, whereby various navigation functions are then realized.

The navigation system according to the invention incorporates a relatively large capacity of flash memory for reading programs from a CD-ROM of the external memory unit, and a relatively small capacity of ROM having a program for executing CD start up processing (program loading means) as described above. The flash memory is a non-volatile memory means which memory is maintained even if the power is cut off. The flash memory program also functions as CD start up processing occurs to check programs stored in the flash memory upon starting a program of the ROM thereby serving as a program reading means and as a disc management information reading means, etc. of the CD-ROM of the information memory unit 103. Loading of the programs is executed after judging a condition between the external memory units' information and the ROM flash memory.

The information transmitting unit 105 comprises a VICS (Vehicle Information & Communication System) for obtaining information by utilizing a FM multiplex signal (multiplexed text broadcasting), a radio beacon, an optical beacon, a data transceiver for exchanging information with an information center (for example, an ATIS) or with other vehicles by utilizing a cellular telephone, a personal computer, etc., and so on.

The output unit 106 comprises functions for outputting route guidance information by voice and/or display and for printing out data processed in the CPU 104 when required by a driver. In order to execute such functions, the output unit 106 further comprises a display for displaying input data or route guidance on a screen, a printer for printing out data processed in the CPU 104 or stored in the information memory unit 103, a speaker for outputting route guidance by voice, and so on.

The display is composed of a simple liquid-crystal display unit, etc., which displays arrows, for example, indicating a screen of an enlarged intersection, a name of a destination, the time, a distance and a travel direction on the basis of map data or guidance data which the CPU 104 processes. Image data is transmitted to the display as bitmap data, whereby a communication line used for a serial communication can be used instead of using a special-purpose image signal, and the other communication line can also be used for this transmission. Further, the display is provided with a memory in which bitmap data is temporarily stored. The display is provided in the instrumental panel in the vicinity of the driver's seat. Observing the display enables the driver to ascertain the present position of the vehicle and to obtain information on a route to follow. Further, the display may be provided in order to be capable of inputting points, roads etc. by touching or tracing a screen with a tablet which includes a touch panel, a touch screen etc. on the display screen, a detailed description of which is omitted.

Figure 2:
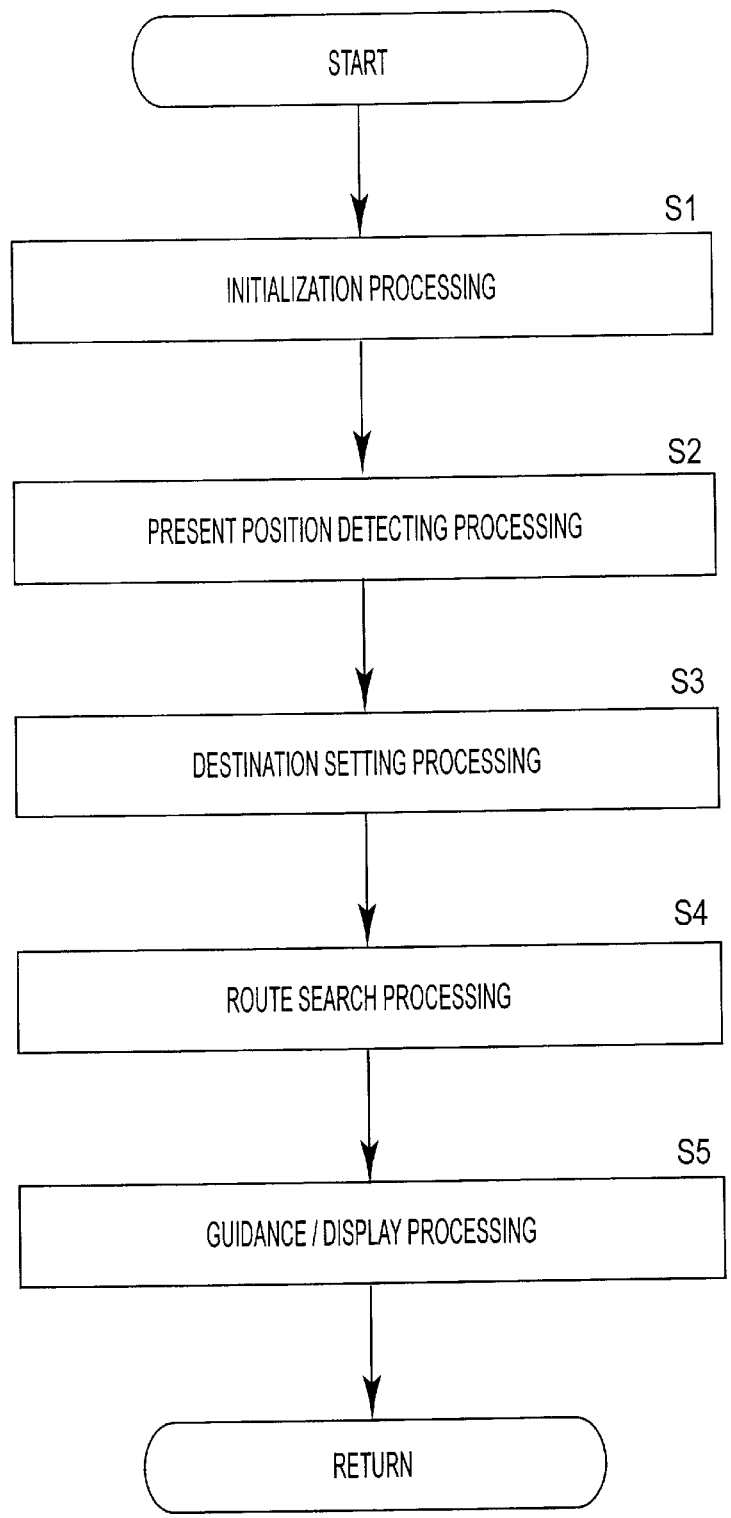
FIG. 2 is a flowchart describing the processing of the navigation system according to FIG. 1.

FIG. 2 is a flowchart describing the processing of the navigation system according to the invention. First, a navigation program read from a CD-ROM is initialized and then stored in a flash memory in order to start up the system (step S1). Once the program is started, a present position of the vehicle is detected by the present position-detecting unit 102, centering the detected present position in a vicinity map thereof that is displayed with names, etc. of the centered present position (step S2). Next, a destination is determined by using a destination name such as place names, facility names, etc., or telephone numbers, addresses, registered points, road names, etc. (step S3). Route search from the present position to the destination is then executed (step S4). When a route is determined, route guidance/display is repeated until the vehicle arrives at the destination while continually searching for the present position by the present position-detecting unit 102 (step S5). If roads to stop at along the way are input before reaching the destination, a new search area is set and a re-search is executed for the new search area, and route search is repeated until the vehicle ultimately arrives at the destination.

FIGS. 3–9 show examples of route guidance/display processing executed at step S5 in FIG. 2, which is successive intersection guidance processing. Successive intersection guidance processing is used to output route guidance information that is much easier for a driver to understand when more than three successive guide intersections are located adjacent to each other.

Figure 4:
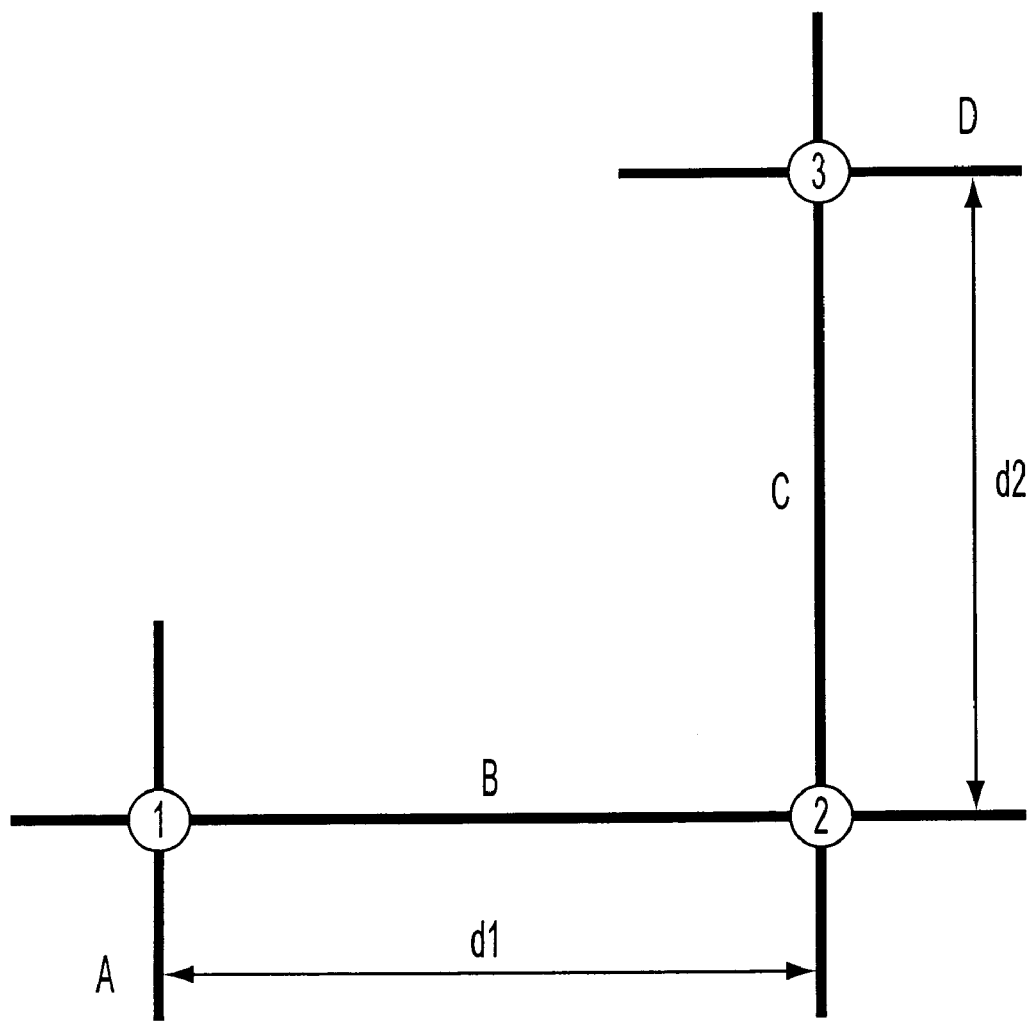
FIG. 4 is a diagram showing an example of successive intersection guidance.

If, as in FIG. 4, more than three intersections are in succession and a distance d1 between the guide intersections 1 and 2 and the distance d2 between the guide intersections 2 and 3 are both short, then according to the previous navigation system, a figure composed of the intersections (1), (2) and (3) is displayed on a screen with arrows indicating "Turn right", "Turn left" and "Turn right", and voice guidance of "Make a right turn. Then, make a left turn N miles ahead. A branch point comes ahead (or a branch point follows)" is output without specifically directing the driver and vehicle through the guide intersection 3. By adding the voice guidance of "A branch point comes ahead (or a branch point follows)" the driver may become confused when encountering the branch ahead. If more than three intersections are located adjacent to each other in succession, the previous navigation system executes processing for providing display/voice guidance on all the guide intersections at once, e.g., "Turn right, then left, then right" without providing timely direction to negotiate latter intersections. For the third intersection onwards, for instance, an intersection figure thereof is displayed, however "A branch point comes ahead (or a branch point follows)" is still given as voice guidance. Therefore, the driver has to watch the screen to determine a route to follow, and guidance is difficult for him to understand.

Figure 3:
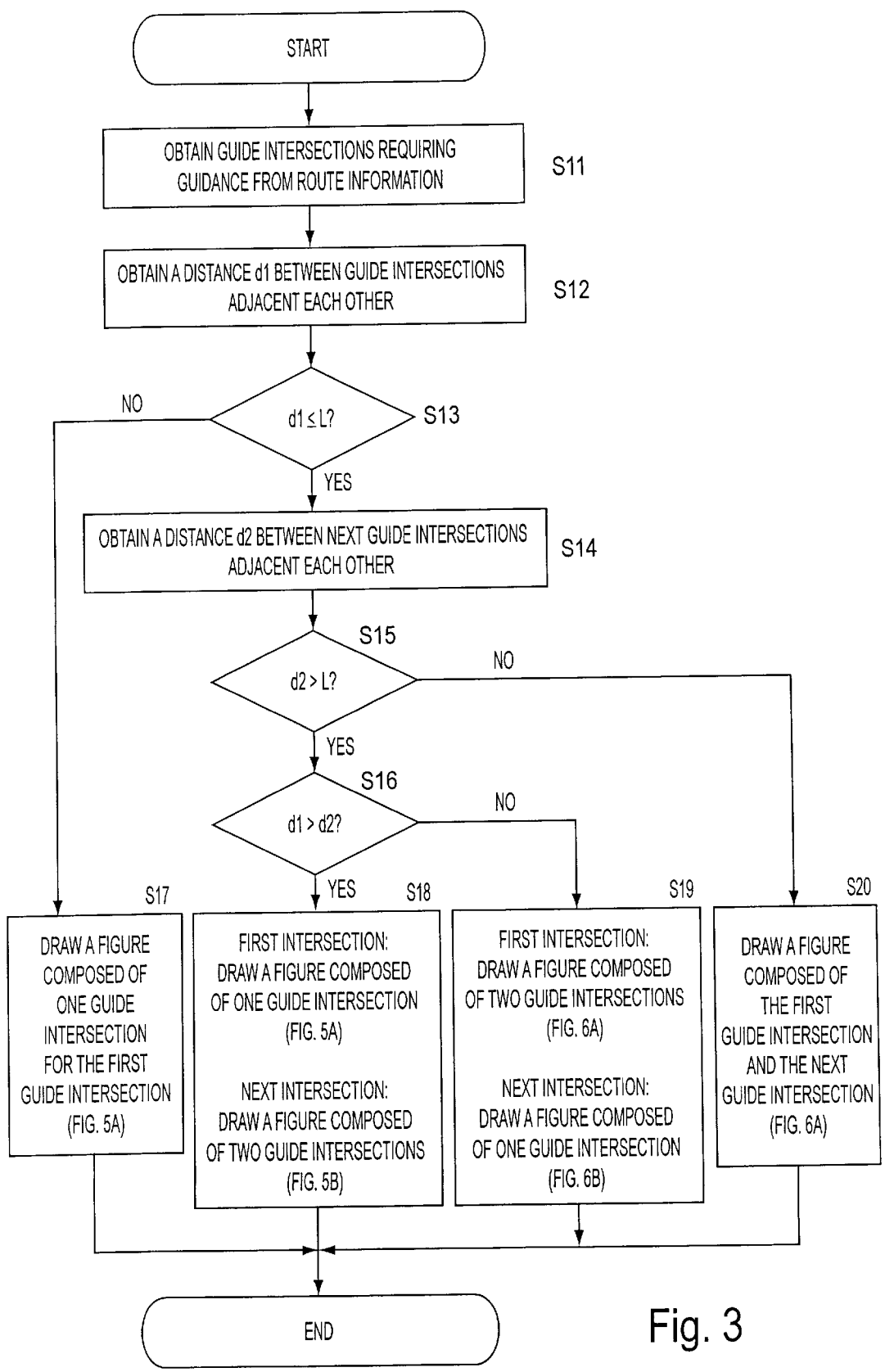
FIG. 3 is a flowchart describing detailed processing of the guidance/display processing according to FIG. 2.
Figure 5A:
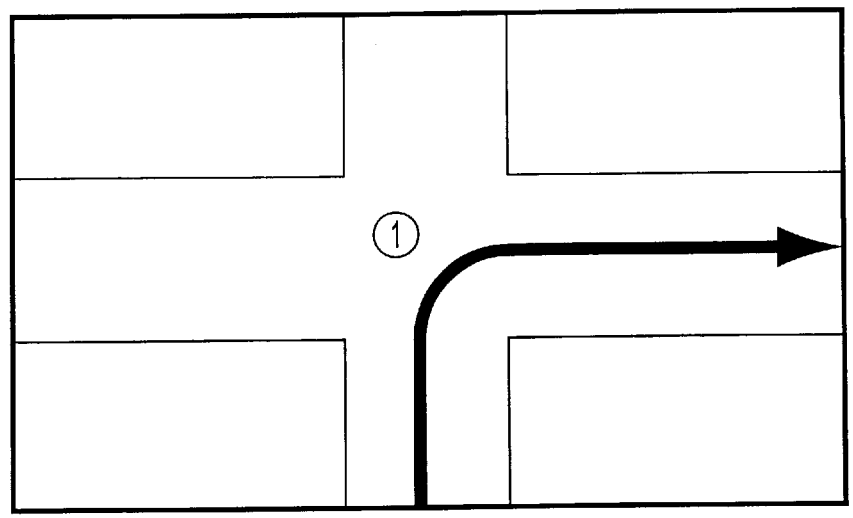
FIGS. 5(A)–(B) are diagrams showing guidance according to FIG. 3.
Figure 5B:
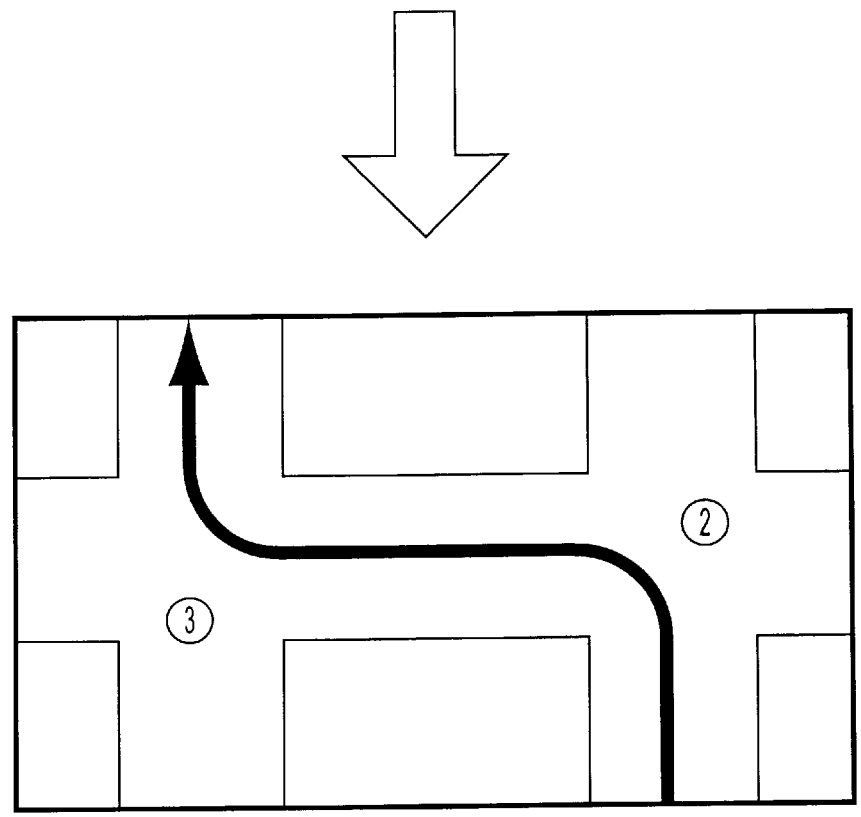
Figure 6A:
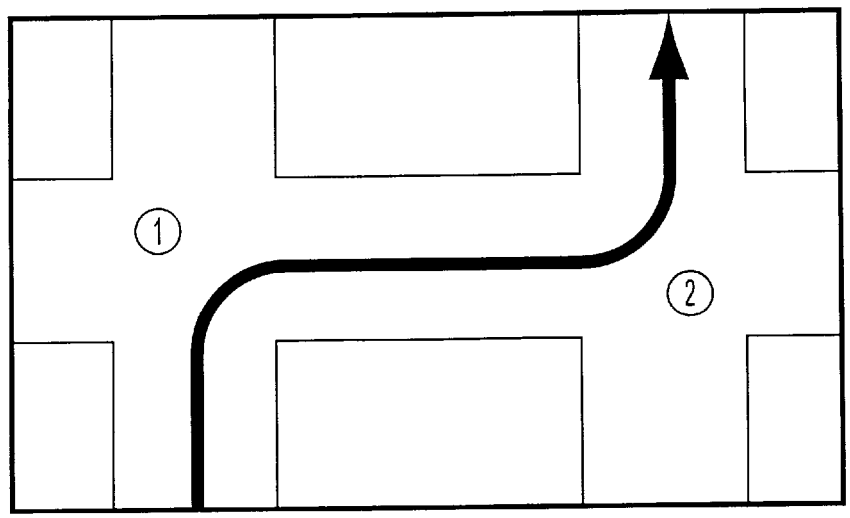
FIGS. 6(A)–(B) are diagrams showing guidance according to FIG. 3.
Figure 6A:
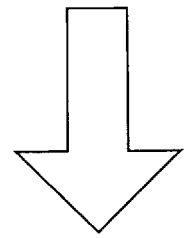
Figure 6B:
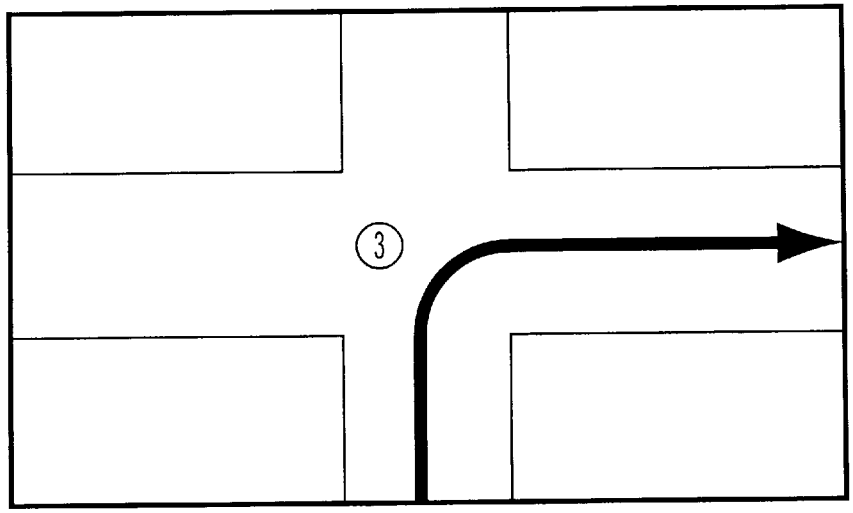

An example of guide processing in order to solve this problem is explained with reference to FIGS. 3–6. FIG. 3 explains a processing of successive intersection guidance. First, the control means distinguishes and obtains guide intersections requiring guidance from route information (step S1). Next, referring to FIG. 4, distances between adjacent intersections are obtained (step S2). A distance between intersections can be obtained by adding the previously obtained distance as road data. The distance may also be obtained by reading the previously stored data. Then, it is judged whether the obtained distance d1 between intersections is within a predetermined distance L, for example, within 150 m. (This obtained distance d1 varies according to the speed of vehicle and it is different between a general road and an expressway). If the distance d1 is not within the predetermined distance L, a figure composed of the first guide intersection is drawn at step S17 and output as route guidance information. On the other hand, if the distance d1 between the guide intersections is within the predetermined distance L, a distance d2 between the next intersections is continuously obtained (step S14). Then, if it is judged that the distance d2 between the next two intersections is above the predetermined distance L at step S15, a figure composed of two intersections such as the first guide intersection and the next guide intersection is drawn and output as route guidance information at step S20. On the other hand, if it is judged that the next distance d2 between the intersections is within the predetermined distance L at step S15, the first distance d1 between the intersections is compared to the distance d2 between the next guide intersections at step S16. At this stage, for example, if the first distance d1 between the guide intersections is longer, a figure composed of one guide intersection is drawn for the first intersection, and a figure composed of two guide intersections is drawn for the next intersections, which is output as route guide information at step S18 (FIGS. 5A and 5B). When it is judged that the first distance d1 between the guide intersections is shorter than the predetermined distance L at step S16, a figure composed of two guide intersections is drawn for the first two guide intersections, then a figure composed of one guide intersection is drawn for the next guide intersection, which is output as guide information at step S19 (FIGS. 6A and 6B).

Further with reference to FIG. 4, were the distance d1 between the first guide intersection 1 and the next guide intersection 2, and the distance d2 between the guide intersection 2 and the following guide intersection 3 are both within the predetermined distance L, e.g., 150 m, then a figure composed of all three guide intersections is drawn. However, it is more appropriate to draw a figure composed of up to two guide intersections for viewing purposes. Therefore, a control means compares the lengths between the distances d1 and d2, and if it is judged that d1 is greater than d2, then a figure composed of the guide intersection 1 is output as route guide information on the guide intersection 1 shown in FIG. 5A, which is then replaced by a figure composed of the guide intersections 2 and 3 as route guidance information on the guide intersection 2 shown in FIG. 5B. Further, if it is judged that d1 is less than d2, then a figure composed of the guide intersections 1 and 2 is output as route guidance information for the guide intersection 1 shown in FIG. 6A, which is then replaced by a figure composed of the guide intersection 3 as route guidance information on the guide intersection 3 shown in FIG. 6B. By controlling figures in this way, even if a plurality of guide intersections exists in succession on the route, proper route guidance information can be given for each guide intersection.

Figure 7:
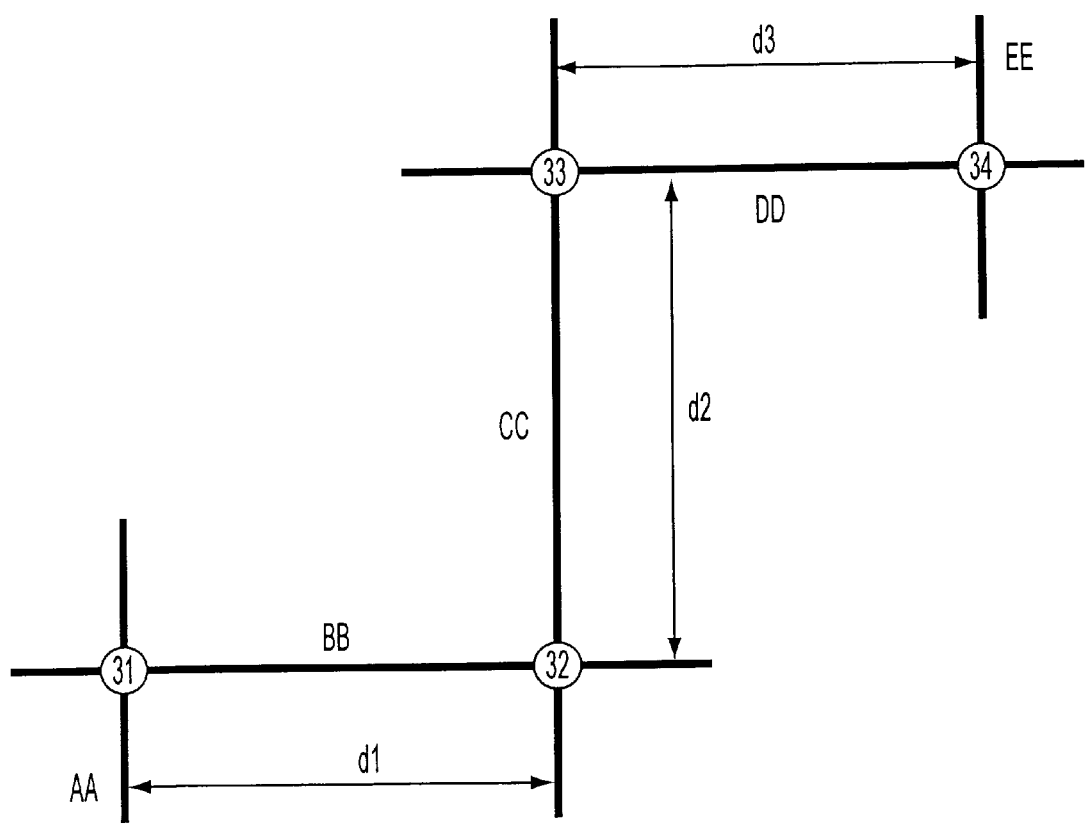
FIG. 7 is a diagram showing another example of successive intersection guidance.

Next described is the case when four guide intersections are in succession with reference to FIG. 7. For example, if distances between intersections are d1<d2<d3, then a figure composed of the guide intersections 1 and 2 is output as route guidance information on the guide intersection 31, and a figure composed of one guide intersection is output for respective guide intersections 33 and 34. Further, if the distances between intersections are d2<d1<d3, then a figure composed of the guide intersections 32 and 33 is output as guide information on the guide intersection 32. Therefore, route guidance information on the guide intersections 31 and 34 is output with a figure composed of only one intersection. Thus, by comparing distances between the successive guide intersections, a figure is output composed of the two guide intersections adjacent each other and having the shortest distance therebetween.

Further, in the above example, when intersection figures are given a priority according to the shortest distance, the figure output is controlled according to the relationships between the successive intersections. For example, if distances between intersections are d3<d2<d1, d1<d3<d2 and d3<d1<d2, a figure composed of the guide intersections 31 and 32 is output as route guidance information on the intersection 31. At this stage, the successive relationship of guidance is interrupted so that a figure composed of the intersections 33 and 34 is output as route guidance information on the guide intersection 33. Thus, a plurality of successive guidance processing is controlled on the basis of the judgment of the successive relationship of guide intersections after route guidance information is output by composing guide intersections, whereby, route guidance information can be provided accurately even if more guide intersections are in succession.

Still, further, it may be controlled such that visual and voice route guidance is performed for the first guide intersection in the figure of composed intersections, and voice guidance is not performed for the second guide intersection. Alternatively, it may be controlled that voice guidance may be output for the second guide intersection. Furthermore, it may be controlled that a direction to which the vehicle should turn at a following third guide intersection can be output.

Figure 8:
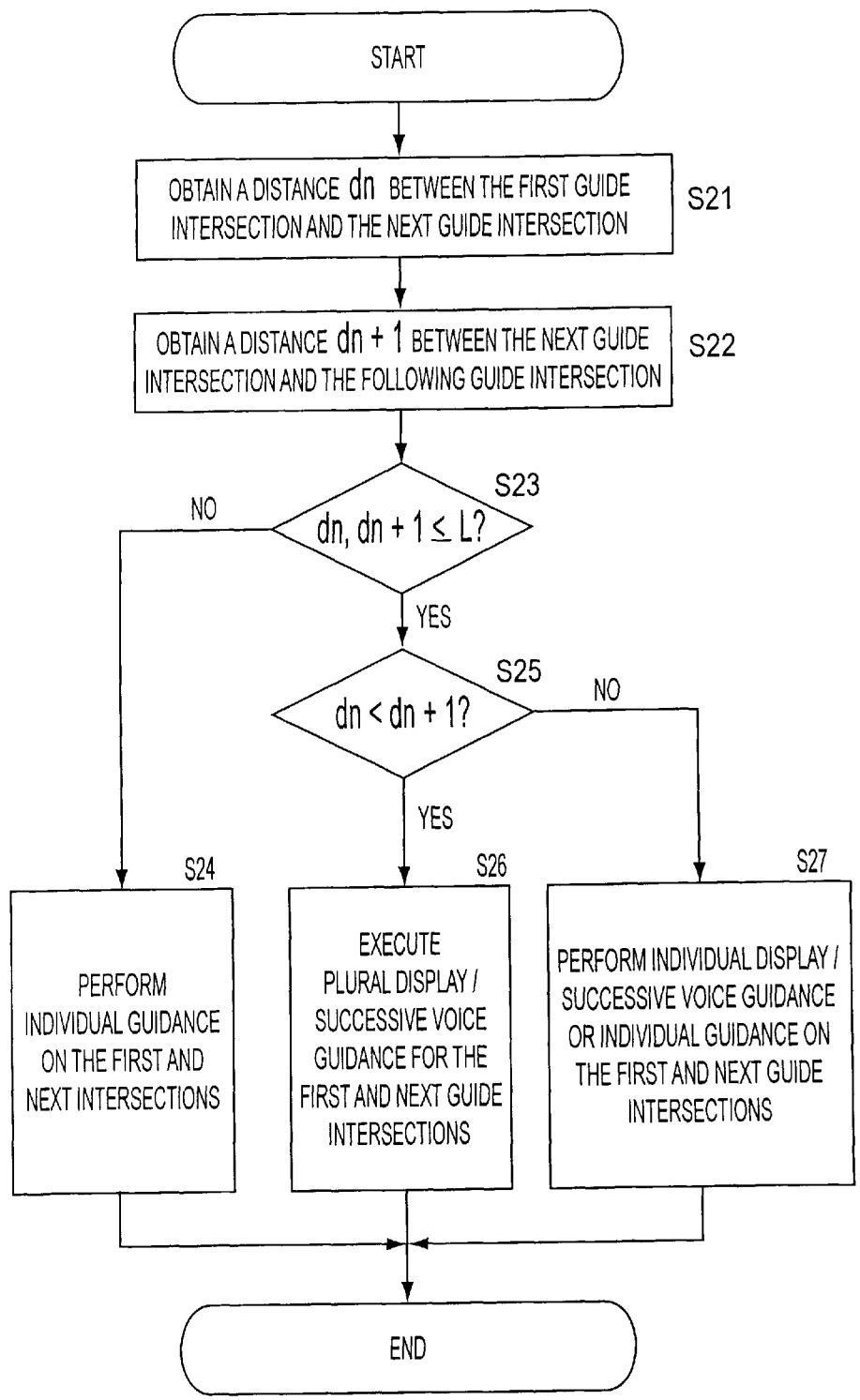
FIG. 8 is a flowchart describing another example of successive intersection guidance.

FIGS. 8 and 9 show other examples of successive intersection guidance processing. For instance, FIG. 8 is a flowchart describing successive intersection guidance processing and FIGS. 8 and 9 both describe a method of successive intersection guidance. First, a distance dn between a first and next guide intersections is obtained from road data stored in the information storage unit 103 at step S21. Then a distance dn+1 between the next and the following guide intersections is obtained in the same way at step S22. It is then judged if the distance dn and distance dn+1 are both below the predetermined distance L at step S23. If the answer is no, namely the distances dn and dn+1 between the guide intersections are longer than the predetermined distance, then single route guidance is provided to the first and the following guide intersections at step S24, and if the distances dn and dn+1 are both below the predetermined distance L, it is then judged further if dn is shorter than dn+1 at step S25. If the first distance dn between the guide intersections is shorter than the next distance dn+1 between the guide intersections, a plural display/sequential voice guidance is provided to the first and next guide intersections at step S26. Further, if dn is not shorter than dn+1, then individual display/successive voice guidance or individual route guidance is given to the first and next guide intersections at step S27.

According to the above processing, if the distance d1 is below the distance d2, then plural display/successive voice guidance is performed for the intersections 1 and 2, and individual route guidance is performed for the intersection 3 as shown in FIG. 4. Namely, as approaching the guide intersection 1 in the section A, a figure composed of the guide intersections 1 and 2 is displayed on the screen with arrows indicating "Turn right" and "Turn left". Further, the intersection figure is drawn to display both the intersections 1 and 2 on one screen by locating the middle point between the intersections 1 and 2 at the center. As passing through the intersection 2 and into the section C, the figure is redrawn to depict the guide intersection 3 which is displayed with an arrow indicating "Turn right" accompanied with voice guidance of "Make a right turn.".

Further, in FIG. 4, if the distance d1 is longer than the distance d2, an individual display/successive voice guidance is performed for the intersections 1 and 2 and plural display/successive guidance is performed for the intersections 2 and 3. Namely, when approaching the guide intersection 1 in the section A, a figure of the intersection 1 is displayed with an arrow indicating "Turn right", and voice guidance of "Make a right turn, then make a left turn N miles ahead." is output. As passing through the guide intersection 1 and into section B, the figure is redrawn to depict intersections 2 and 3, which are displayed with arrows indicating "Turn left" and "Turn right" and accompanied with voice guidance of "Make a left turn, then make a right turn".

Further, when four intersections are in succession as shown in FIG. 7, wherein the distances are d1=d2=d3, plural display/successive voice guidance is performed for both the intersections 31 and 32 as well as the intersections 33 and 34. Namely, when traveling in the section AA, a figure composed of the guide intersections 31 and 32 is displayed and "Make a right turn, then make a left turn." is output as voice guidance. Then, as passing through the guide intersection 32, the figure is redrawn to depict the guide intersections 33 and 34, which are displayed with section CC and a voice guidance of "Make a right turn, then make a left turn." is output. If the distances are d1<d2<d3, d1<d3<d2, d3<d1<d2, the same processing is applied. After all, the distance d1 between the first and the next guide intersections and the distance d3 between the following two guide intersections are both shorter than another distance d2 between the guide intersections. Therefore individual route guidance, or an individual display/successive voice guidance cannot be performed for respective guide intersections 31–34.

If the distances are d2<d1 <d3, then individual display/successive voice guidance is performed for the intersections 31 and 32, plural display/successive voice guidance is performed for the intersections 32 and 33, and single route guidance is performed for the intersection 34. Namely, on approaching the guide intersection 31 in the section AA, the intersection figure of 31 is displayed on the screen, and voice guidance of "Make a right turn, then make a left turn N miles ahead" is output. Thereafter, in the section BB after passing through the intersection 31, the intersection figure is redrawn to depict the guide intersections 32 and 33, and voice guidance of "Make a left turn, then make a right turn" is output. In the section DD, the intersection figure is redrawn to a figure composed of the guide intersection 34 and voice guidance of "Make a left turn." is output. The same processing is applied if the distances are d2<d3<d1. After all, the next distance d2 between the guide intersections is shorter than the other distances between the guide intersections. Therefore, individual guidance or an individual display or successive voice guidance can not be performed for the guide intersections 32 and 33.

If the distances are d3<d2<d1, an individual display/successive voice guidance is performed for the intersections 31 and 32 as well as the intersections 32 and 33, and plural display/successive voice guidance is performed for the intersections 33 and 34. Namely, on approaching the guide intersection 31 in the section AA, the figure of intersection 31 is displayed on the screen and voice guidance of "Make a right turn, then make a left turn N miles ahead" is output. Then, on passing through the intersection 31 and into the section BB, the intersection figure is redrawn to a figure composed of the guide intersection 32 and voice guidance of "Make a left turn, then make a right turn N miles ahead." is output. Further, once in the section CC, the intersection figure is redrawn again to a figure composed of the guide intersections 33 and 44, and voice guidance of "Make a right turn. Then, make a left turn" is output.

As described above, if more than three guide intersections are located adjacent to each other in succession, respective distances between the guide intersections are obtained and then respectively compared, thereby, controlling the plural display and successive voice guidance of two guide intersections by giving a priority to the shortest distance between the intersections. Even if a distance between the adjacent guide intersections is shorter than distances requiring plural display and successive voice guidance, plural display and successive voice guidance on more than three guide intersections are not performed. Thus, voice guidance for less than two guide intersections is always performed, and a figure composed of less than two guide intersections is drawn so that route guidance information can be more clearly provided to a driver.

Figure 10:
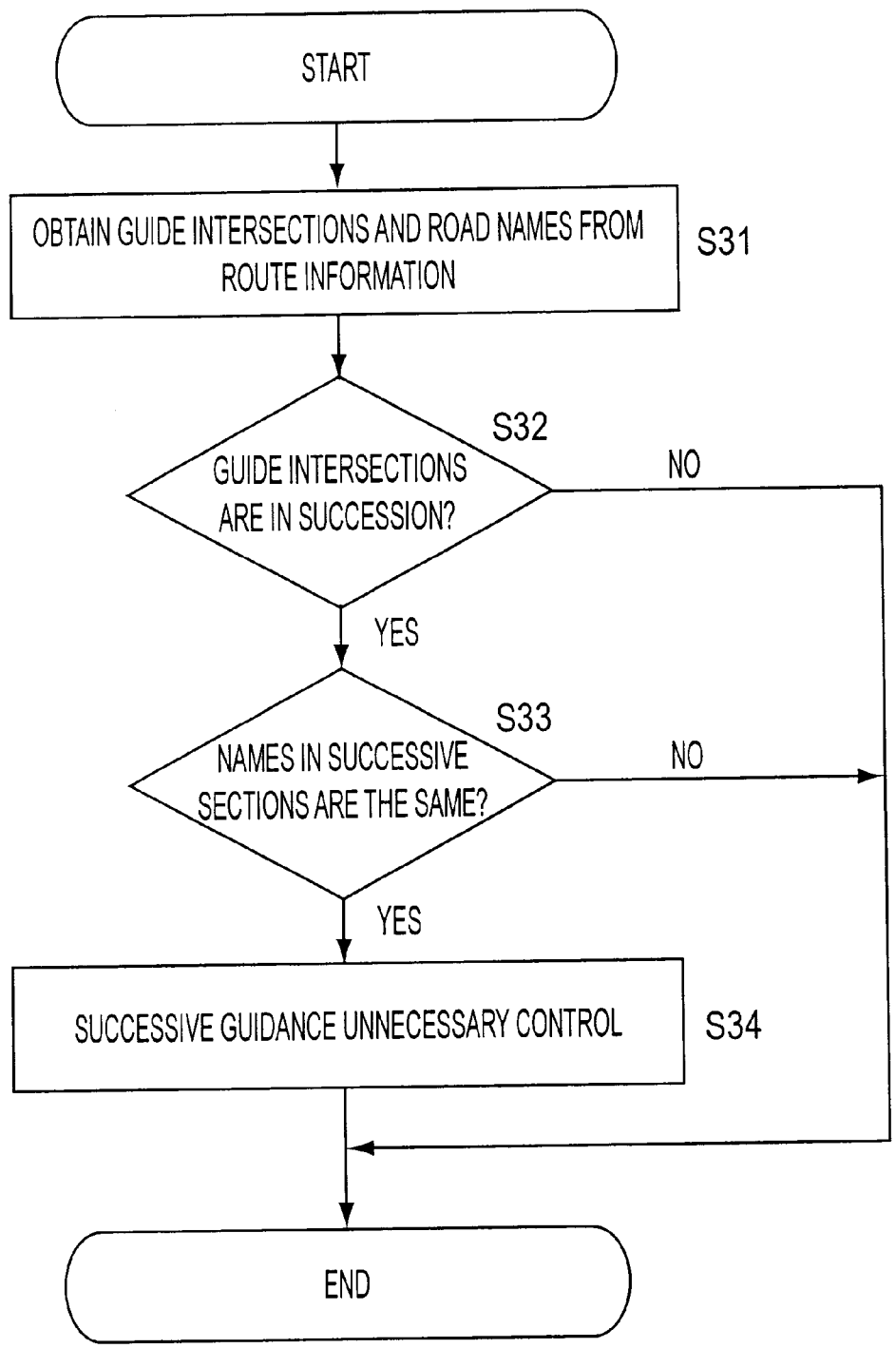
FIG. 10 is a flowchart describing an example of successive guidance unnecessary control on guidance/display processing according to FIG. 2.

FIGS. 10–14 show examples of route guidance/display processing executed at step S5, and diagrams and flowcharts describing successive guidance unnecessary control. FIG. 10 is a flowchart showing one example of the successive guidance unnecessary control.

In FIG. 10, road names and guide intersections are first obtained from route guidance information calculated at step S31. It is then judged whether the guide intersections are in succession at step S32. If the guide intersections are in succession, it is further judged whether road names of successive sections are under the same name at step S33. If the roads are under the same name, a process of the successive guidance unnecessary control is executed at step S34.

Figure 11:
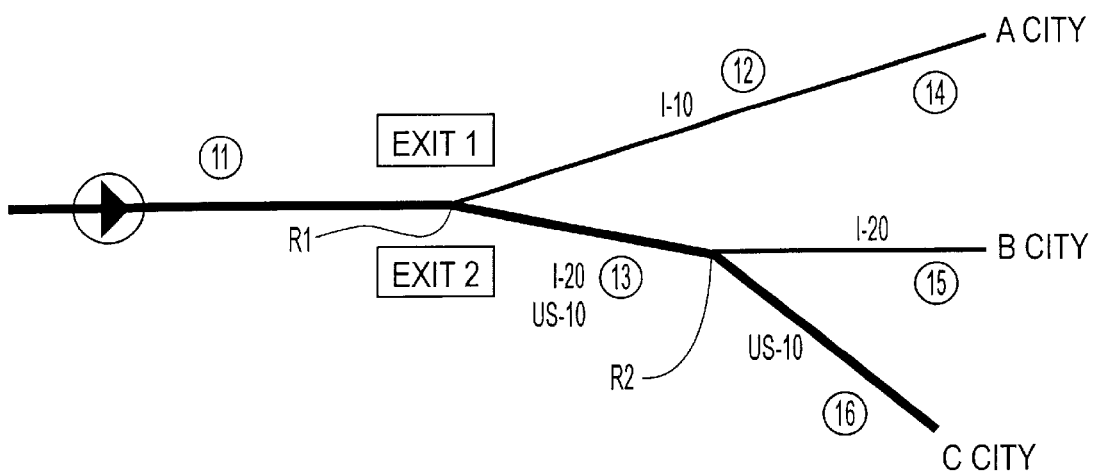
FIG. 11 is a diagram showing an example of FIG. 10.
Figure 12:
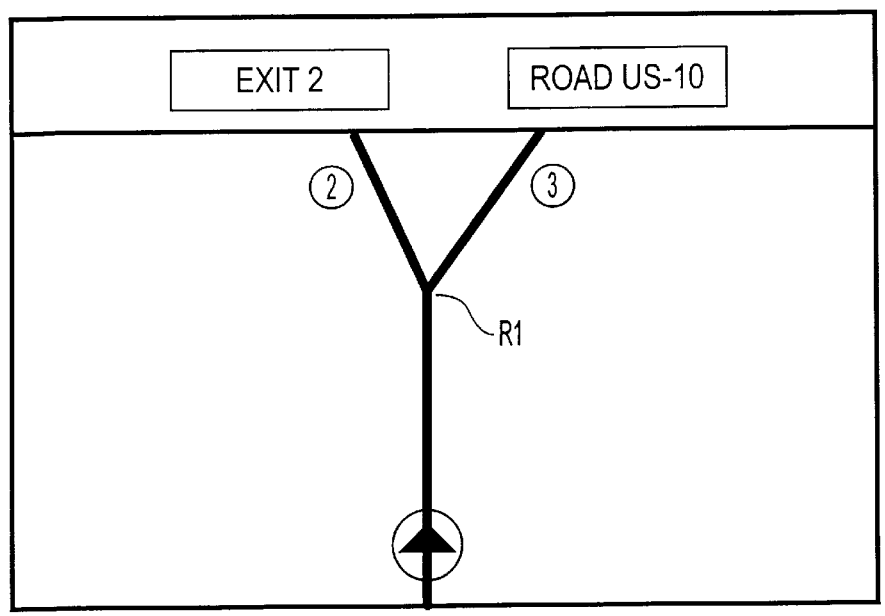
FIG. 12 is a diagram showing an example of FIG. 10.

The above successive guidance unnecessary control is described with reference to FIGS. 11 and 12. In FIG. 11, in which 11 to 16 are roads and a road name of "I-10" is given to the Roads 12 and 14, road names of "I-20" and "US-10" are both given to the Road 13, a road name of "I-20" alone is given to the Road 15, and a road name of "US-10" alone is given to the Road 16. Additionally, a sign of "Exit 1" is given to the direction to the Road 12 and a sign of "Exit 2" is given to the direction to the Road 13 at the intersection R1.

If, in FIG. 11, one is guided to the City C, a guidance route is determined on the Roads 11, 13 and 16, as approaching the guide intersection R1. Then, as shown in FIG. 12, a figure of the guide intersection R1, the sign of "Exit 2", and the road name of "Road US-10" are displayed on the screen. Thus, it is controlled that route guidance is not performed even if the vehicle passes through the guide intersection R1 and approaches the guide intersection R2. Other than the above exit number and road names, abbreviations of road names and city names are displayed as a means of display, and if there is a plurality of destination data, it is selectively displayed by giving a priority to those data. Further, route guidance may be performed with voice output in addition to the display of the destination data. In this case, voice guidance such as "Go toward US-10", "Proceed along the road", "Drive through US-10 for a while", "Take diagonally to the right direction" etc. are performed, and in the same way, it is controlled that guidance is not performed even if approaching the guide intersection R2.

From the above control, it is not necessary to perform successive route guidance on the guide intersections if successive guide intersections exist on roads under the same name. Therefore a driver can drive comfortably without confusion, and excessive route guidance information can be avoided.

Next, another example of successive guidance unnecessary control is described again with reference to FIG. 11. Here, control means can control outputting route guidance information by judging a change of road attributes and a successive relationship of roads. For example, there is a route shown proceeding from the Road US-10 to the Road I-20 at the Branch point R2, whereafter the vehicle travels on the Road I-20 for a while. At this stage, it may be controlled that "Travel on I-20 for a while" is output as route guidance information when the vehicle makes a left turn, at which the attribute of the road is changed before reaching the Branch point R2.

Further, when road names are output as guide information, then route guidance information at the branch point R1 is output as "Proceed to I-10" when making a left turn, or "Proceed to US-10" when making a right turn since the lane number 10 is in common for both the departing roads I-10 and US-10 even though the road types thereof are different when they are compared. Next, regarding the branch point R2, since the lane numbers of two departing roads I-20 and US-10 are different, route guidance may be performed using the lane numbers such as "Proceed to 20." when making a left turn or "Proceed to 10" when making a right turn.

Furthermore, when a plurality of road names is given to the first branch point as guidance information, guidance information for the first branch point can be controlled by comparing the road names given to the first branch point and road names on the route to proceed at the next branch and then searching a common road name there to. For example, when there is a route which the vehicle turns left onto from the branch point R2, the vehicle thus proceeds left to I-20 at the branch point R2. Therefore, it may be controlled that route guidance information of "This is a route to I-20." is output for the branch point R1 on the basis of "I-20" attached to the branch point R1 and a name of the destination of "US-10".

Figure 14:
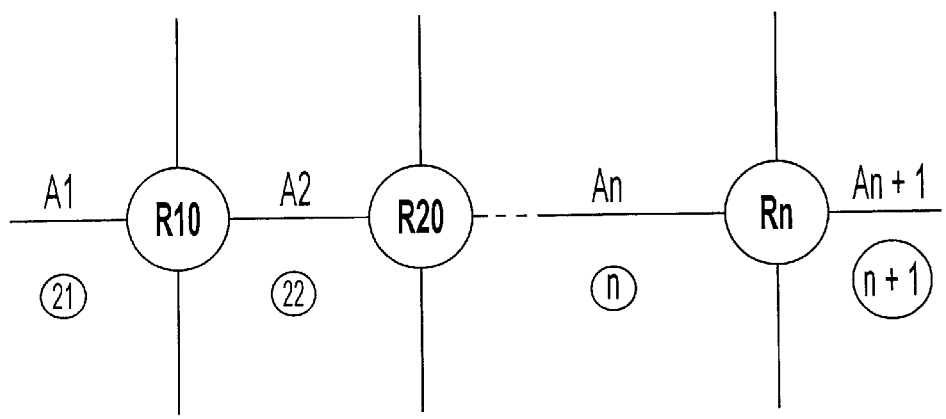
FIG. 14 is a diagram describing successive rotary intersections according to FIG. 13.

Next, another example of successive guidance unnecessary control is described. FIG. 14 shows an example in which rotary intersections R10 to Rn are in succession between the roads 21 and n+1 and the vehicle proceeds straight ahead to the roads 21 to n+1. Namely, when the rotary intersections are in succession on a route and-the route is extending straight through those rotary intersections, the same guidance with the same voice phrase is output for several times resulting in confusion to a driver. Therefore, confusion is reduced when repetition of the same voice guidance is minimized when the vehicle travels straight ahead on roads having the same road name and rotary intersections and branch points exist on the route.

Figure 13:
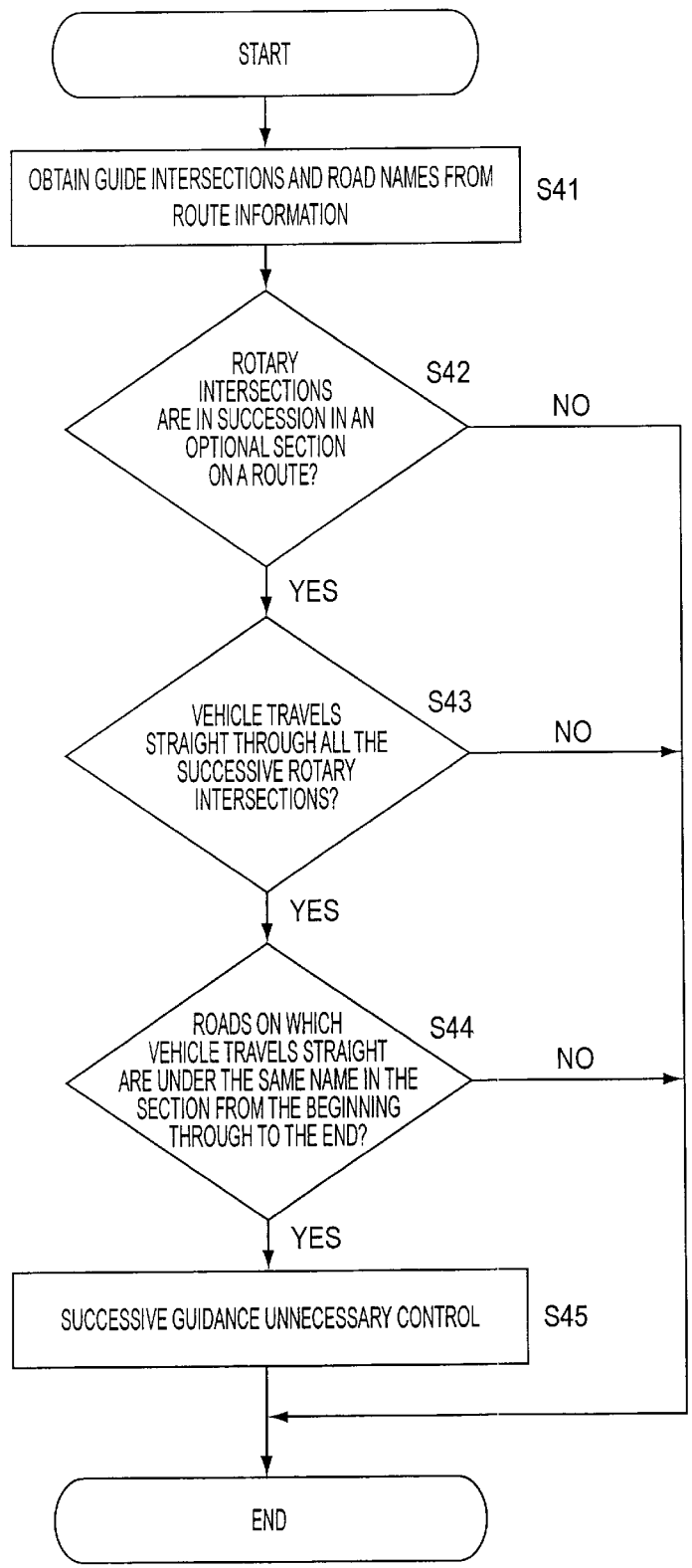
FIG. 13 is a flowchart describing another example of successive guidance unnecessary control.

FIG. 13 is a flowchart describing the above processing. First of all, information on guide intersections and road names is obtained from route information at step S41. It is then judged whether rotary intersections are in succession in a desired section on the guide route at step S42. If the rotary intersections are in succession, it is then judged whether the route is extending straight through all the rotary intersections at step S43. If the route extends straight through all the rotary intersections, it is further judged whether roads in the section in which the rotary intersections are in succession on the route have the same road name at step S44. If the roads have the same road name, then successive guidance unnecessary control is performed at step S24. This successive guidance unnecessary control is a process in which a series of successive rotary intersections is guided only once as one intersection, for example, a voice phrase "National road A10 continues for the next 2 km." is output only once and no guidance is performed until the route goes through the series of successive intersections after that voice guidance is performed. This simplifies route guidance greatly for a driver, rather than repeating route guidance for each rotary intersection as they occur or all at once upon beginning travel upon the road having the rotary intersections thereon.

FIGS. 15–18 are a diagram and flowcharts showing examples of route guidance/display processing executed at step S5 in FIG. 2, and further describe guidance information processing between the entrance Bb and the exit Dd.

Figure 15:
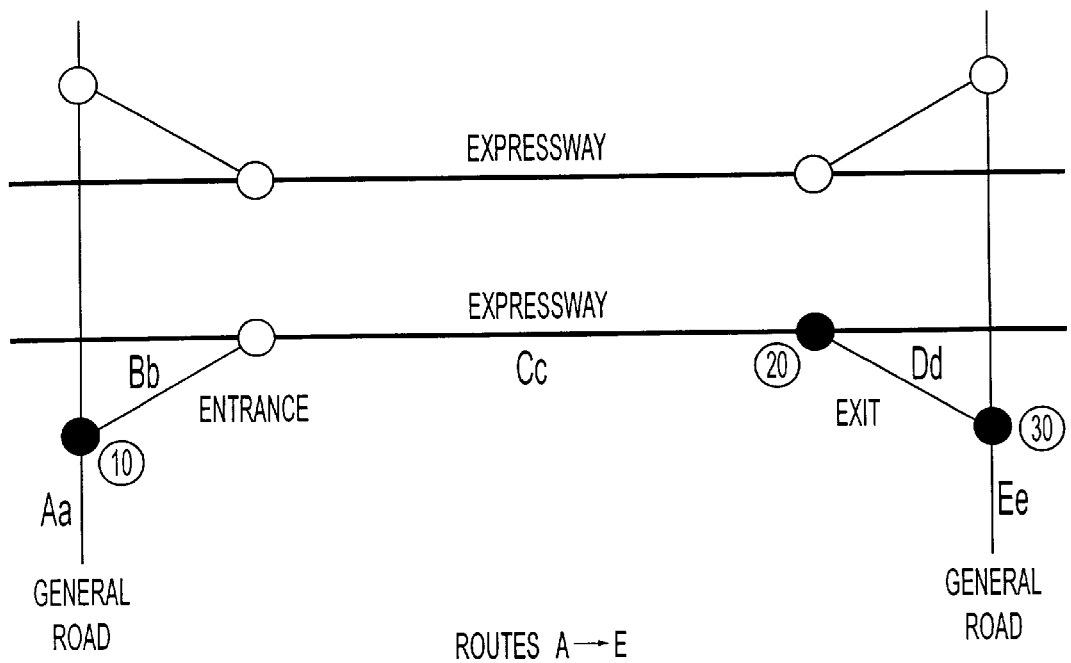
FIG. 15 is a diagram showing guidance on an entrance and exit that is an example of guidance/display processing according to FIG. 2.

FIG. 15 is a diagram describing an example when two general roads are relatively located adjacent to each other toward the expressway, a guidance route is determined from the general road, namely the section Aa to the guide intersection 10 extending to the expressway entrance, namely the section Bb, then to the expressway, namely the section Cc, through the guide intersection 20 extending to the expressway exit, namely the section Dd, then through the guide intersection 30 and finally to the general road, namely the section Ee. FIG. 15 is also describing when the section Cc between the expressway entrance Bb and the exit Dd is below the predetermined distance (ex. 2 km). The section Cc is below the predetermined distance (ex. 2 km) means that the distance d1 between the intersection 10 and intersection 20 is relatively short (ex. below 750 m) as described in FIG. 4, according to the previously introduced method of an individual display/successive voice guidance. A figure composed of the guide intersection 10 is displayed in the section Aa shown in FIG. 15 and voice guidance of "Make a right turn at the expressway entrance. The exit comes next." is performed for the guide intersections 10 and 20. Then, the figure is redrawn to a figure composed of the guide intersection 20 and voice guidance of "Take the right direction at the expressway exit. Then, make a right turn." Is performed for the guide intersections 20 and 30 in the section Cc, then, the figure is redrawn to a figure composed of the guide intersection 30 and displayed, and voice guidance of "Make a right turn" (individual guidance) is performed in the section Dd.

However, in the above prior method, when the entrance Bd and the exit Dd are located adjacent to each other, guidance on the exit Dd is output before approaching the entrance Bb. Further, in the section Aa, guidance on the expressway exit Dd is already performed regardless of the present position that is still on the general road and not entering into the expressway, furthermore, in the section Cc, guidance on the general road is already performed regardless of the present position that is still on the expressway and not entering into the general road, thus, a problem is raised that guidance is not clear for the driver to understand.

Figure 16:
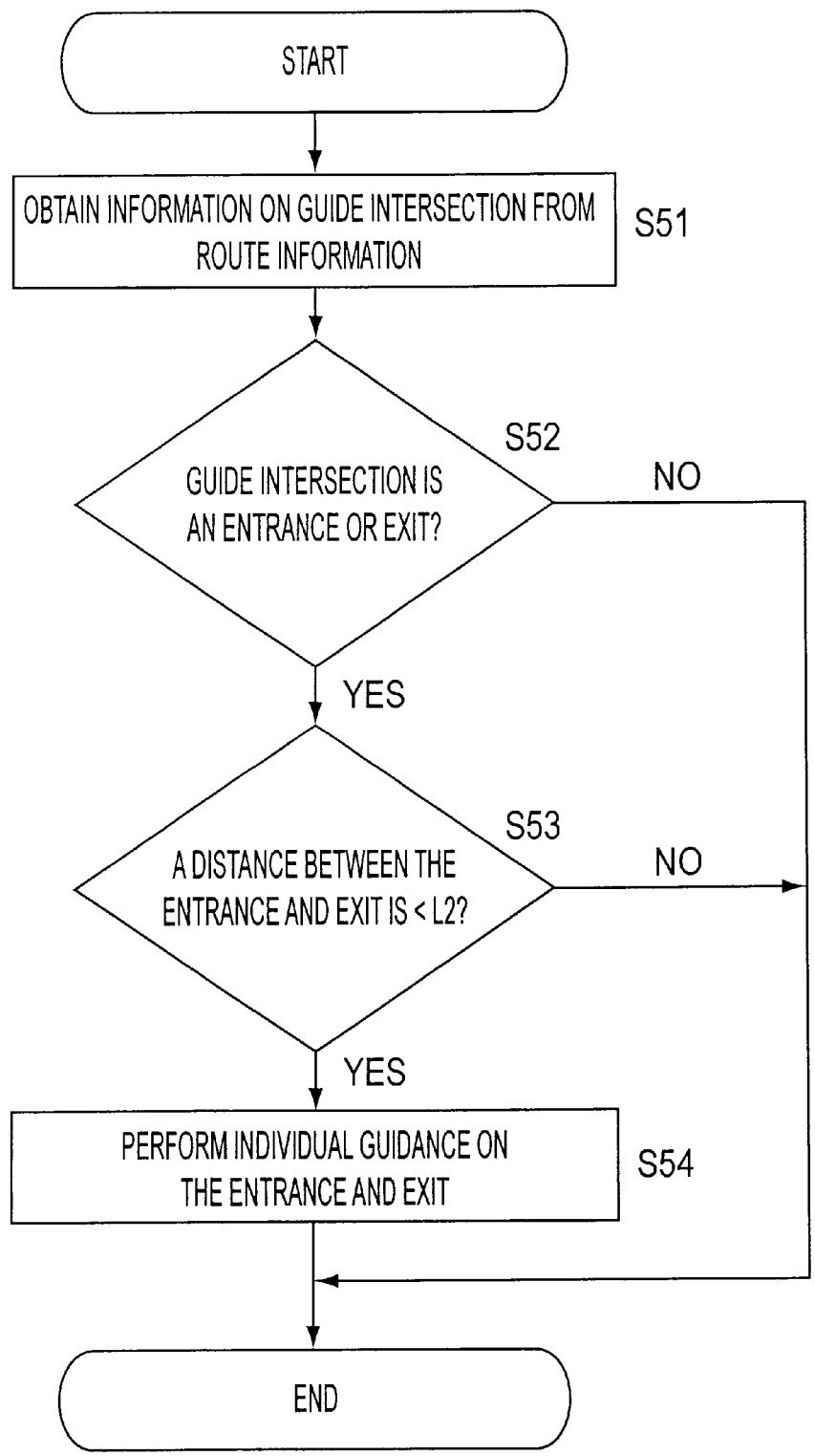
FIG. 16 is a flowchart describing an example of the entrance and exit guidance processing.

FIG. 16 is a flowchart describing one example of the entrance and exit guidance processing for solving the above problems. First, guide intersection information is obtained from route information at step S51. Then, it is judged whether an exit and entrance are respectively found in the obtained guide intersections at step S52. If they are found, it is further judged whether a distance between the entrance and the exit is below the predetermined distance L2 at step S53, and if the distance is below the predetermined distance L2, it is then controlled that individual guidance is performed for the entrance and exit.

The above control is described with reference to FIG. 15, wherein single guidance that is not to perform guidance successively on the expressway entrance and exit, namely, only a figure composed of the guide intersection 10 is displayed in the section Aa and voice guidance of "Take the right direction at the expressway entrance." is output. Next, the figure is redrawn to a figure composed of the guide intersection 30 and displayed in the section Cc, and voice guidance of "Take the right direction at the expressway exit." is output. Thus individual route guidance is provided not to perform guidance successively on the expressway exit and the general road. Then, the figure is reconfigured to depict the guide intersection 30 displayed in the section Dd, and voice guidance of "Make a right turn.", whereby individual guidance is performed. In this way, guidance on the entrance and exit is divided from guidance on the expressway itself, and the various route guidance provided is well organized and easily understood, thereby increasing a driver's recognition of route guidance.

Figure 17:
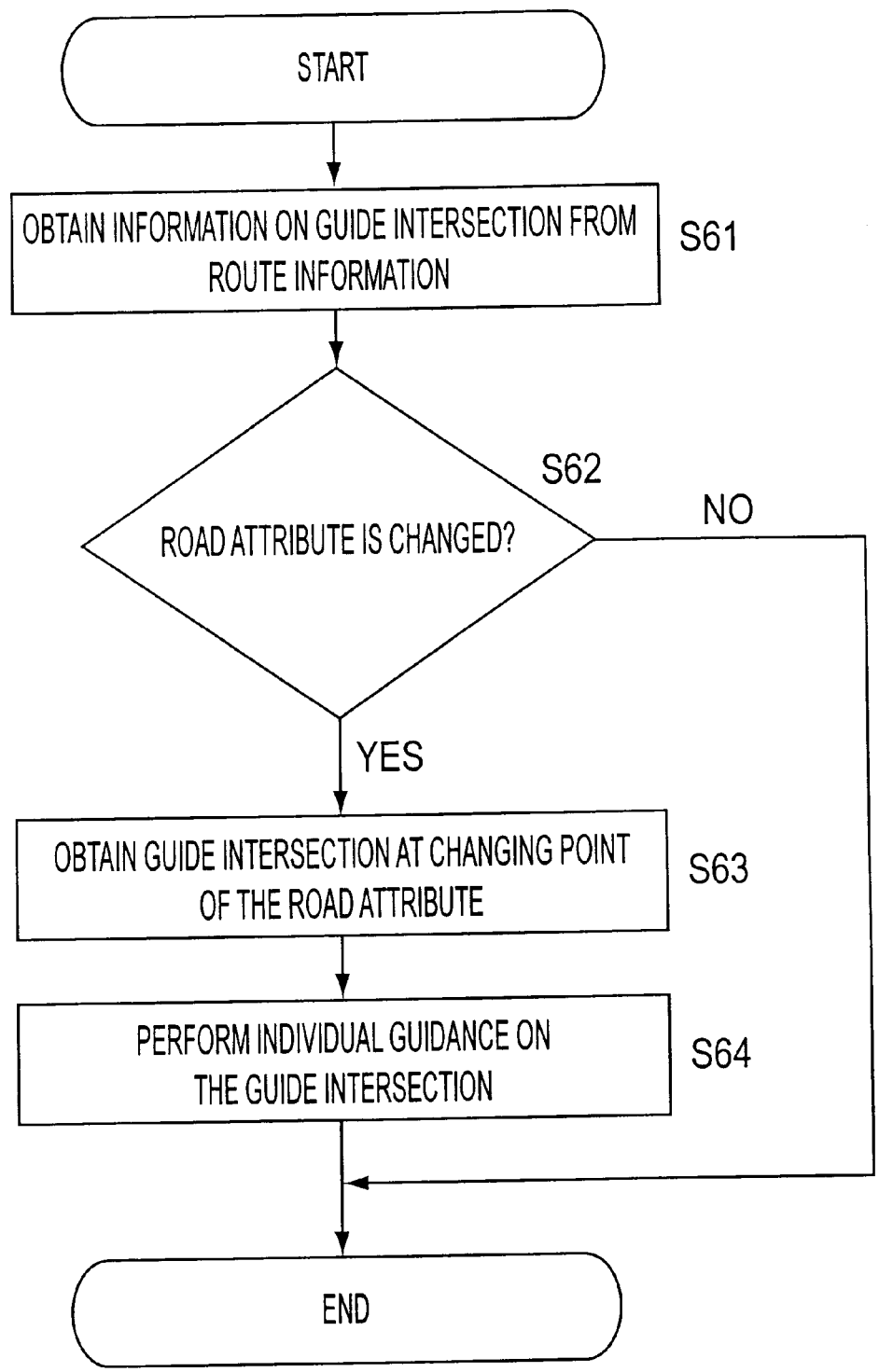
FIG. 17 is a flowchart describing another example of the entrance and exit guidance processing.

FIG. 17 is a flowchart describing another example of the entrance and exit guidance processing. Information on the guide intersections is first obtained from route information at step S61. Thereafter it is judged whether a road attribute is changed (e.g., a general road and an expressway) at step S62. If the road attribute is changed, guidance information on a guide intersection representing a road attribute changing point is obtained at step S63, and it is controlled that individual guidance on the guide intersection is therefore output.

Figure 18:
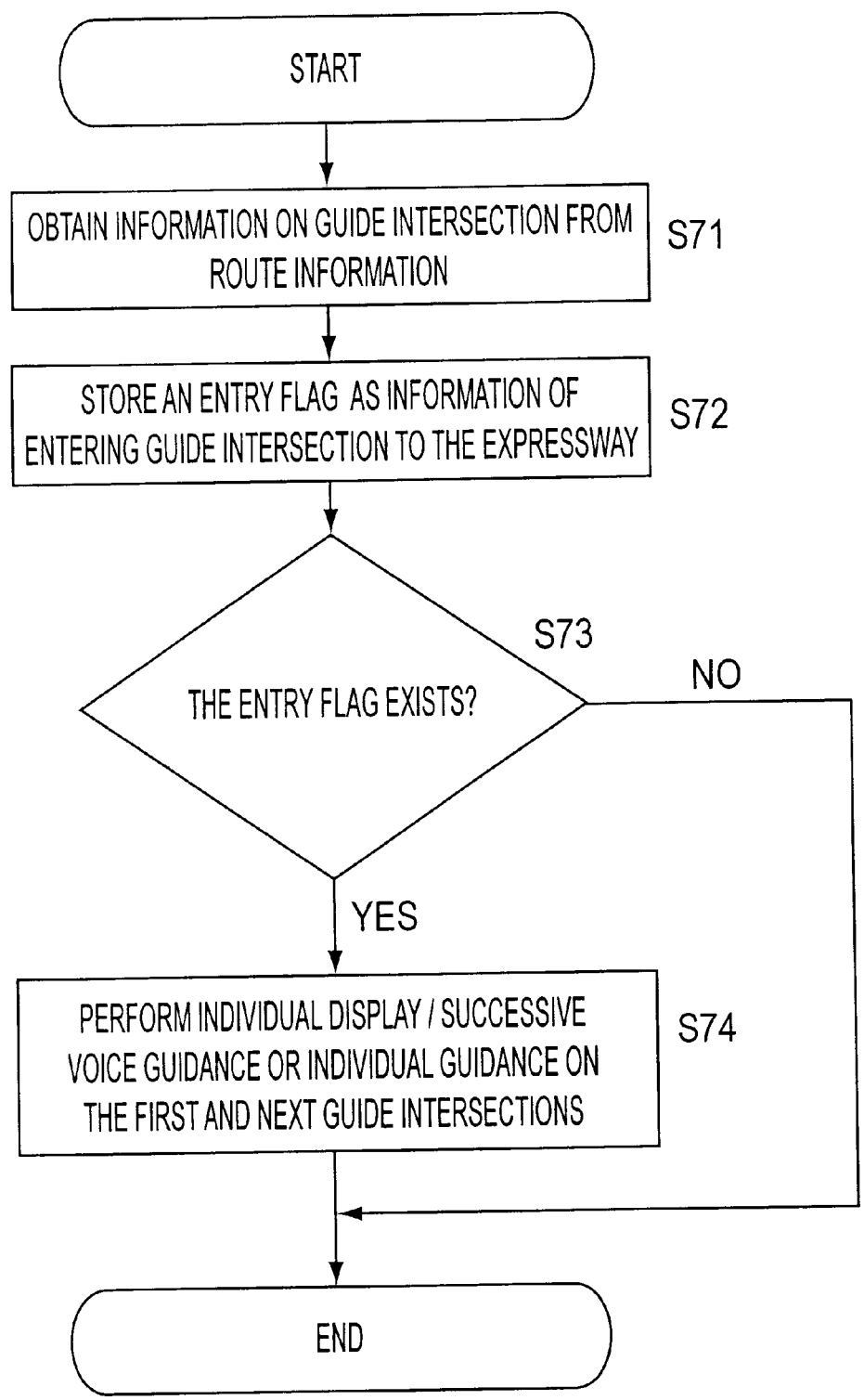
FIG. 18 is a flowchart describing another example of the entrance and exit guidance processing.

FIG. 18 is a flowchart describing another example of the entrance and exit guidance processing. Guide intersection information is obtained from route information at step S71 and an entry flag is stored as guidance information for guide intersections entering into a road, such as an expressway, etc., at step S72. Then, it is judged whether there is an entry flag. If an entry flag exists, it is controlled that individual guidance on the guide intersection is output at step S74.

Further, individual route guidance is performed for the entrance and exit in each above example. However, when there are branch points between the entrance and the exit, as when there are branch points leading to roads other than the route, viewing of the display screen becomes poor or confusing. It can be controlled therefore that voice guidance information is output respectively and a plurality of guide intersections are simultaneously drawn and output for display.

Next, road name guidance on the above route guidance/display processing when a road of the same attribute but having various road names according to areas is described with reference to FIGS. 19 and 20.

In road name guidance processing according to the previously introduced navigation system, wherein road attributes and road names are provided as road data, for example, route information on the predetermined route is stored in a RAM before the predetermined distance to the branch point requiring guidance, road data after the branch point is searched on the basis of the stored route information thereof, road attributes and road names on the route after the branch point are displayed and output by voice, thus route information is provided to the driver.

In view of road irregularities, such that roads of the same attribute may have different names depending on the areas or one of the same name may have different attributes, a simpler navigation system organization is beneficial. For example, an expressway in the United States is called "FREEWAY" in one area and "EXPRESSWAY" in another area. In the previously proposed navigation system, all road names given to a road regardless of area are used to describe an expressway in the United States, thus increasing needlessly the amount of data.

Therefore, in this example; if a first road and a later road have the same road attribute or are under the same road but they are named differently depending on areas, a judgment means is implemented for judging an area in which roads exist is established. Then, it is constructed that road names corresponding to the area are output. Thus, a detailed route guidance can be provided with a small amount of data.

Figure 19:
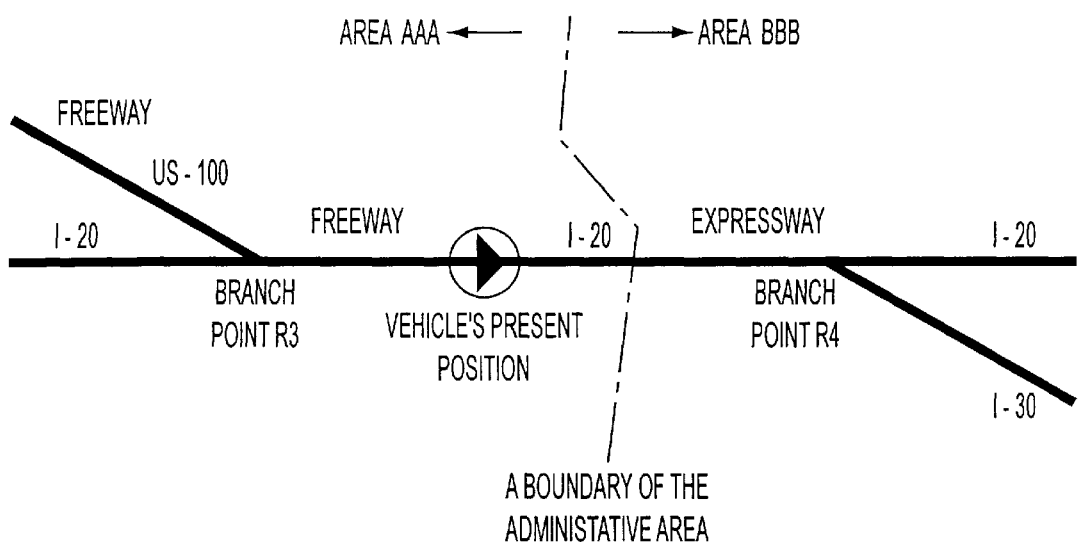
FIG. 19 is a diagram describing FIG. 20.

FIG. 19 is described in the form of a schematic diagram whereby the same road or the same attribute are called different names according to areas. Here, a solid line indicates an expressway, wherein a road number "I-20" intersects road numbers "US-100" and "I-30" respectively at the branch points R3 and R4. Further, the road number "I-20" goes beyond a boundary of an administrative area indicated with a dotted chain line and extends to areas AAA and BBB. The expressway is called "Freeway" in the area AAA and "Expressway" in the area BBB.

Figure 20:
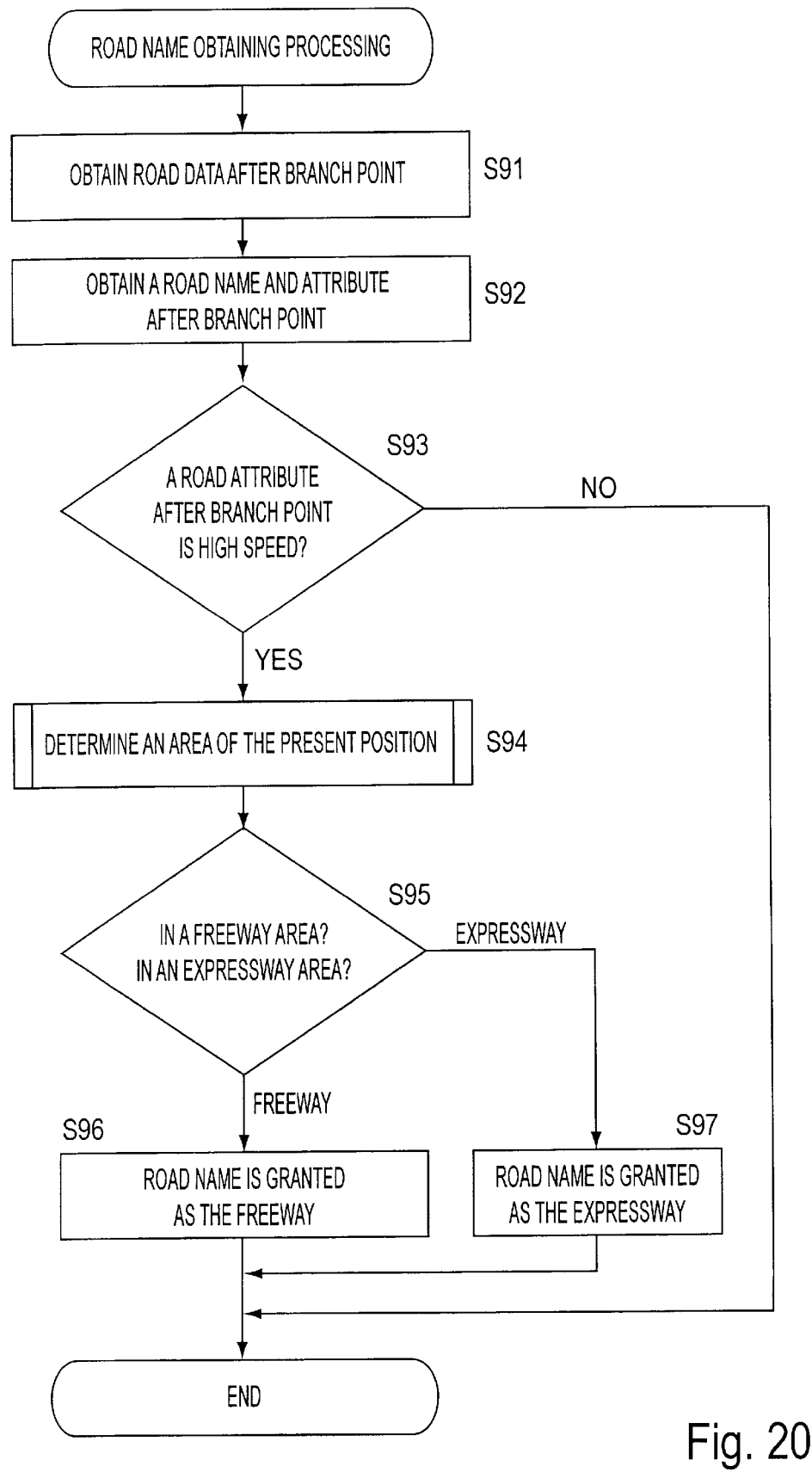
FIG. 20 is a flowchart describing road name obtaining processing on branch point guidance which is an example of route guidance/display processing according to FIG. 2.

FIG. 20 is a flowchart describing a road name obtaining process for branch point guidance in respect to route guidance/display processing. For example, this process is applied when road names are obtained at step S31 of route guidance/display processing described in FIG. 10. First of all, road data of a departing road to be a route among roads departing from a branch point (guide intersection) to be a guidance target is obtained from the information memory device 103 at step S91, and road names (or road numbers) on the road data and road attributes are obtained at step S92. Then, it is judged whether a road attribute of the departing road after the branch point is an expressway. If it is an expressway, then it is further judged whether an area in which the present position belongs is a "FREEWAY" area or an "EXPRESSWAY" area at steps S94 and S95. If it is a "FREEWAY" area, it is named "FREEWAY" (step S96), and if it is the "EXPRESSWAY" area, it is named "EXPRESSWAY" (step S97). Then, "FREEWAY" or "EXPRESSWAY" with the obtained road name (road number) is displayed or output with voice.

Figure 21A:
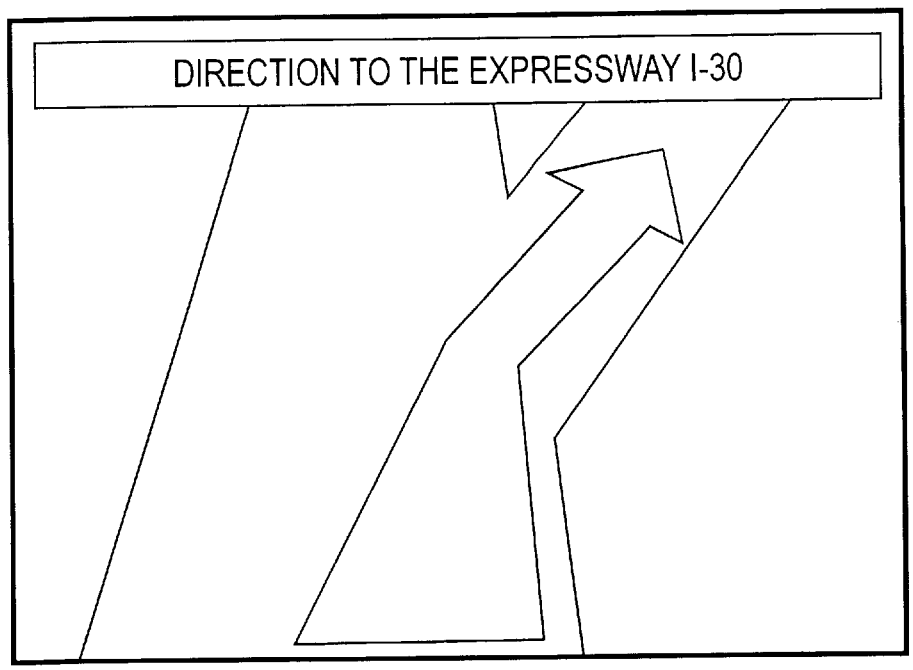
FIGS. 21(A)–(B) are diagrams showing display examples to be output by processing of FIG. 20.

FIGS. 21(A) is a diagram showing a schematic display of the branch point and the name of direction after the branch point when performing branch point guidance. In processing of FIG. 20, a display example is shown if a road number after departing from the branch point as a guide target is "I-30" and the present position is located within the area of "EXPRESSWAY".

In the above branch point guidance processing, when road guidance on the departing road after the branch point is performed, it is constructed that a corresponding road name is judged on the basis of the area to which the vehicle's present position belongs. However, it can also be constructed that an area to which the vehicle's present position belongs is judged on the basis of the position of a branch point or an intersection that serves as the guidance target. With reference to FIG. 19, when the vehicle's present position is located in the area AAA (namely the "FREEWAY" area), but the branch point R4, i.e., a next guidance target, is located in the area BBB (namely, the "EXPRESSWAY" area), then for road name obtaining processing, it is judged that the guidance output of branch point R4 is the area for guidance target instead of performing step S94 in FIG. 20.

As described above, data structure implemented to output names corresponding to the judged areas where roads exist, also stores road names, road numbers and road attributes with respect to road data of each road and further independently stores road name information with area information ("FREEWAY", "EXPRESSWAY" etc.). To be precise, for example, the name information is stored as the "FREEWAY" corresponding to the area AAA and the "EXPRESSWAY" corresponding to the area BBB.

Further, each road data can be stored by dividing each area controlled and searched. For example, road data is stored by dividing into rectangular areas in the form of block and each block stores area information (area AAA or area BBB, etc.). Alternatively, it may be controlled that road data may be stored by each administrative area such-as a village, a town, a city, a state, a country and the like.

In present position located area judging processing at step S94 in FIG. 20 or judging processing for an area to which a branch point or an intersection belongs, wherein an area in which the present position or the branch point belongs is judged on the basis of coordinates thereof. As described above, when road data (map data) is divided by block and stored, or by administrative area and stored, a block or an administrative area is judged by comparing coordinates of the present position or the branch point with coordinate information on the block or the administrative area, and an area to which the present position or the branch point belongs is judged on the basis of area information on the block or the administrative area. The block or the administrative area may be judged on the basis of a road (or a section) by determining the road (section) on which the vehicle travels.

Figure 21B:
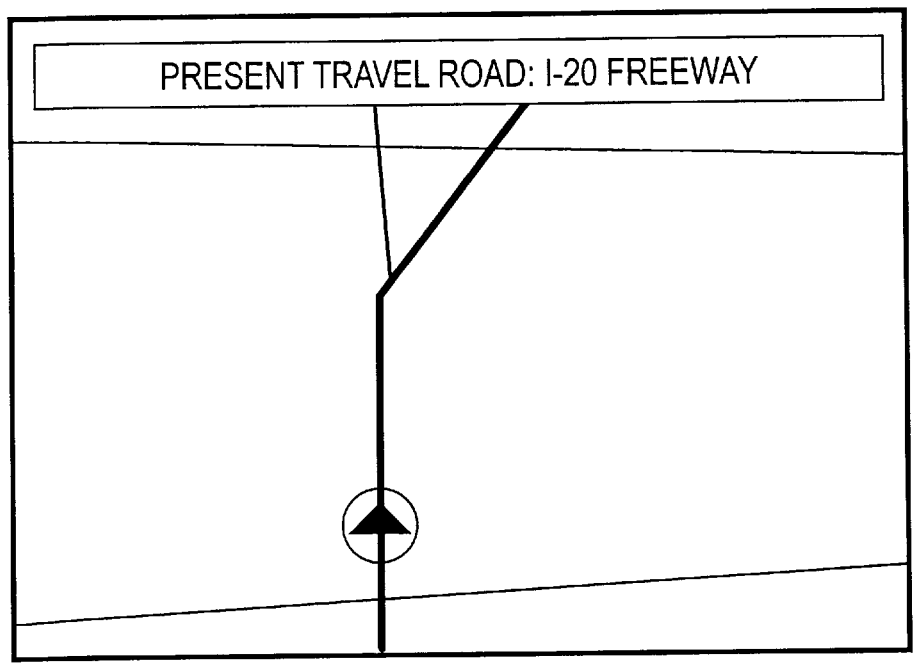

Route guidance/display processing of the branch point or the intersection is described in the above example. However, a road name, or road number in which the vehicle is currently traveling can also be guided and displayed as shown in FIG. 21(B). In this example, a means for recognizing a road on which the vehicle is currently traveling is established, and in FIG. 20, a target by which a road name and a road attribute is obtained and is assigned to a road on which the vehicle is currently traveling.

Although the condition of the expressway in the United States is described in the above examples, it is understood that the invention is not limited to these embodiments and further it is applicable to all cases in which called road names are changed according to areas. It is described by using two areas AAA and BBB in the above example, needless to say it is applicable to more than three areas.

What is claimed is:

1. A navigation system for outputting route guidance information along a route, wherein route guidance information to be output is controlled on the basis of relationships between successive guide intersections when at least three guide intersections requiring guidance exist, and successive relationships between the guide intersections is determined by comparing distances between guide intersections, and then controlling the contents of the guide information on the basis of the determined successive relationships.

2. A navigation system for outputting route guidance information along a route, comprising:
   a means for obtaining distances between at least three successive guide intersections on the route; and
   a control means for comparing distances between guide intersections, the distances obtained by the obtaining means, wherein the control means controls the content of guide information on the basis of the compared relationships of the at least three successive guide intersections.

3. The navigation system according to claim 2, wherein the control means provides a figure of at least two of the successive guide intersections having the shortest distance therebetween when a plurality of at least three guide intersections are in succession.

4. The navigation system according to claim 2, wherein the control means provides a figure of a plurality of successive guide intersections when a plurality of at least three guide intersections are in succession.

5. A memory medium in which programs of a navigation system for outputting route guidance information along a route are stored, wherein at least one program controls route guidance information to be output on the basis of distance relationships of at least three guide intersections when the at least three guide intersections requiring guidance are in succession.

6. A navigation system for outputting route guidance information along a route, wherein it is controlled such that guidance is not performed at guide intersections when a vehicle is traveling on roads having the same road name and the guide intersections are in succession.

7. A navigation system for outputting guidance information along a route, comprising:

a means for obtaining guide intersections requiring guidance on a route and road names between the guide intersections; and a control means for controlling guidance at the guide intersections on the basis of the distance relationship between successive guide intersections and road names obtained by the obtaining means, wherein the control means controls that route guidance is not performed at the guide intersections when a plurality of the obtained guide intersections are in succession and the roads traveled between the successive guide intersections bear the same name.

8. The navigation system according to claim 6, wherein at least one guide intersection is a rotary intersection.

9. The navigation system according to claim 7, wherein at least one guide intersection is a rotary intersection.

10. The navigation system according to claim 6, wherein distance information and road names to reach a final guide intersection along a route are output at the first guide intersection of the successive guide intersections.

11. The navigation system according to claim 7, wherein distance information and road names to reach a final guide intersection along a route are output at the first guide intersection of the successive guide intersections.

12. A memory medium in which programs of a navigation system for outputting guidance information along a route are stored, wherein the memory medium stores a program for controlling that guidance is not to be performed at the guide intersections when the vehicle travels on roads under the same name and guide intersections are in succession.

13. A navigation system for outputting route guidance information along a route comprising:

a means for obtaining guide intersections requiring route guidance on the route;

judgment means for judging whether guide intersections obtained by said obtaining means are an entrance or exit and for judging a distance between the entrance and exit; and a control means for outputting individual route guidance information on the entrance and exit guide intersections respectively on an expressway (freeway, speedway or superhighway) as judged by said judgment means when a first guide intersection based on a vehicle's present position is the expressway (freeway, speedway or superhighway) entrance and the next guide intersection is the exit, wherein said control means control that the individual route guidance is performed on respectively the entrance and exit when the distance between the entrance and exit is within a predetermined distance.

14. A navigation system according to claim 13, wherein when the distance between the expressway (freeway, speedway or superhighway) entrance and exit is within a predetermined distance and the branch point exists between the entrance and the exit, the voice guidance is output at respective intersections and the guide intersections are simultaneously drawn and output for display.

* * * * *